(12) United States Patent
Penot et al.

(10) Patent No.: US 6,984,689 B2
(45) Date of Patent: Jan. 10, 2006

(54) RUBBER COMPOSITION FOR A TIRE COMPRISING A REINFORCING INORGANIC FILLER AND AN (INORGANIC FILLER/ELASTOMER) COUPLING SYSTEM

(75) Inventors: Christophe Penot, Saint Pierre des Corps (FR); Vanessa Roy, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/201,531

(22) Filed: Jul. 23, 2002

(65) Prior Publication Data

US 2003/0144394 A1    Jul. 31, 2003

Related U.S. Application Data

(63) Continuation of application No. PCT/EP01/00661, filed on Jan. 22, 2001.

(30) Foreign Application Priority Data

Jan. 24, 2000    (FR)    ................................. 00 01809

(51) Int. Cl.
C08K 3/04    (2006.01)
(52) U.S. Cl. ........................ 524/495; 524/493; 524/430; 525/332.7; 525/342; 252/183.14
(58) Field of Classification Search ................ 524/495, 524/496, 493, 430; 525/332.7, 337.9, 332.8, 525/333.2, 342; 252/183.14
See application file for complete search history.

(56) References Cited

U.S. PATENT DOCUMENTS

| | | | |
|---|---|---|---|
| 3,842,111 | A | 10/1974 | Meyer-Simon et al. |
| 3,873,489 | A | 3/1975 | Thurn et al. |
| 3,978,103 | A | 8/1976 | Meyer-Simon et al. |
| 3,997,581 | A | 12/1976 | Pletka et al. |
| 4,002,594 | A | 1/1977 | Fetterman |
| 4,072,701 | A | 2/1978 | Pletka et al. |
| 4,129,585 | A | 12/1978 | Buder et al. |
| 4,450,030 | A | 5/1984 | Melody et al. |
| 5,534,592 | A * | 7/1996 | Halasa et al. ................ 525/236 |
| 5,569,721 | A | 10/1996 | Scholl et al. |
| 5,580,919 | A | 12/1996 | Agostini et al. |
| 5,583,245 | A | 12/1996 | Parker et al. |
| 5,650,457 | A | 7/1997 | Scholl et al. |
| 5,652,310 | A | 7/1997 | Hsu et al. |
| 5,663,358 | A | 9/1997 | Cohen et al. |
| 5,663,395 | A | 9/1997 | Göbel et al. |

(Continued)

FOREIGN PATENT DOCUMENTS

| | | |
|---|---|---|
| DE | 4435311 | 4/1996 |
| EP | 0810258 | 12/1975 |
| EP | 0334377 | 9/1989 |
| EP | 0501227 | 9/1992 |
| EP | 0502733 | 9/1992 |
| EP | 0683203 | 11/1995 |
| EP | 0735088 | 10/1996 |
| EP | 0784072 | 7/1997 |
| EP | 0794219 | 9/1997 |
| EP | 0867491 | 9/1998 |
| EP | 1043357 | 10/2000 |
| FR | 2094859 | 2/1972 |
| FR | 2206330 | 7/1974 |
| FR | 2765881 | 1/1999 |
| WO | 9610604 | 4/1999 |
| WO | 9928376 | 6/1999 |

OTHER PUBLICATIONS

Kuthan et al., *Ind. Eng. Chem. Prod. Res. Dev.*, 21:191-261 (1982).
Charman et al., *Chem. Commun.*, 476 (1971).
Krow et al., *Tetrahedron Lett.*, 3653 (1971).

(Continued)

*Primary Examiner*—Katarzyna Wyrozebski
(74) *Attorney, Agent, or Firm*—Fitzpatrick, Cella, Harper & Scinto

(57) ABSTRACT

The present invention is directed to a rubber composition that is useful for the manufacture of tires, where the composition is based on a diene elastomer, a reinforcing inorganic filler, and a coupling system. The coupling system comprises a polysulfurized alkoxysilane ("PSAS") coupling agent (inorganic filler/diene elastomer) associated with a 1,2-dihydropyridine and a guanidine derivative. The present invention is further directed to tires and semi-finished products for tires comprising a rubber composition according to the invention. The invention is also directed to a coupling system (inorganic filler/diene elastomer) for a rubber composition based on a diene elastomer reinforced by an inorganic filler, where the coupling system comprises a polysulfurized alkoxysilane (PSAS) coupling agent in association with a 1,2-dihydropyridine and a guanidine derivative.

106 Claims, 9 Drawing Sheets

U.S. PATENT DOCUMENTS

| | | |
|---|---|---|
| 5,663,396 A | 9/1997 | Musleve et al. |
| 5,674,932 A | 10/1997 | Agostini et al. |
| 5,675,014 A | 10/1997 | Cohen et al. |
| 5,684,171 A | 11/1997 | Wideman et al. |
| 5,684,172 A | 11/1997 | Wideman et al. |
| 5,693,172 A * | 12/1997 | Zeldin et al. ............ 156/307.3 |
| 5,696,197 A | 12/1997 | Smith et al. |
| 5,708,053 A | 1/1998 | Jalics et al. |
| 5,747,601 A | 5/1998 | Broussard et al. |
| 5,892,085 A | 4/1999 | Munzenberg et al. |
| 6,420,488 B1 | 7/2002 | Penot |

OTHER PUBLICATIONS

Hofmann, W., ed., *Vulcanization and Vulcanizing Agents*, pp. 180-182, London: MacLaren & Sons, Ltd. (1967).

Brunauter et al., *Journal of the American Chemical Society*, 60:309-319 (Feb. 1938).

March, J., ed., *Advanced Organic Chemistry, 4th Ed.*, p. 937 (John Wiley & Sons).

* cited by examiner

RUBBER COMPOSITION FOR A TIRE COMPRISING A REINFORCING INORGANIC FILLER AND AN (INORGANIC FILLER/ELASTOMER) COUPLING SYSTEM

CROSS-REFERENCE TO RELATED APPLICATIONS

This application is a continuation of International Application Number PCT/EP01/00661, published in French on Aug. 2, 2001, as International Publication Number WO 01/55252 A1 and filed on Jan. 22, 2001, which claims priority to French Patent Application Number 00/01809, filed on Jan. 24, 2000.

FIELD OF THE INVENTION

The present invention relates to diene rubber compositions reinforced with an inorganic filler, which are intended in particular for the manufacture of tires or semi-finished products for tires, and in particular treads for these tires.

BACKGROUND OF THE INVENTION

Since fuel economies and the need to protect the environment have become priorities, it has become desirable to produce elastomers with good mechanical properties and as low a hysteresis as possible so that they can be used in the form of rubber compositions usable for the manufacture of various semi-finished products involved in the constitution of tires, such as, for example, underlayers, calendering or sidewall rubbers, or treads, and to obtain tires with improved properties, having in particular reduced rolling resistance.

To achieve such an objective, numerous solutions have been proposed, first of all ones essentially concentrating on the use of elastomers modified by means of agents such as coupling, starring or functionalizing agents, with carbon black as the reinforcing filler, with the aim of obtaining a good interaction between the modified elastomer and the carbon black. It is generally known that in order to obtain the optimum reinforcement properties imparted by a filler, the latter should be present in the elastomeric matrix in a final form which is both as finely divided as possible and distributed as homogeneously as possible. Now, such conditions may only be obtained insofar as the filler has a very good ability firstly to be incorporated into the matrix during mixing with the elastomer and to disagglomerate, and secondly to be dispersed homogeneously in this matrix.

It is known that carbon black has such abilities, which is generally not true of white or inorganic fillers. For reasons of mutual attraction, the inorganic filler particles have a tendency to agglomerate together within the elastomeric matrix. These interactions have the harmful consequence of limiting the dispersibility of the filler and hence the reinforcing properties to a substantially lower level than that which it would be theoretically possible to achieve if all the (inorganic filler/elastomer) bonds that could be created during the mixing operation were in fact obtained. These interactions also tend to increase the consistency of the rubber compositions and therefore make them more difficult to work ("processability") in the uncured state than in the presence of carbon black.

However, interest in rubber compositions reinforced with inorganic filler was greatly revived with the publication of European Patent Application EP 0 501 227, which discloses a sulfur-vulcanizable diene rubber composition, reinforced with a special precipitated silica of the highly dispersible type, which makes it possible to manufacture a tire or tread with substantially improved rolling resistance, without adversely affecting the other properties, in particular those of grip, endurance and wear resistance. Patent Applications EP 0 810 258 and WO 99/28376 disclose diene rubber compositions reinforced with other special inorganic fillers, specifically aluminas or aluminium (oxide-)hydroxides, of high dispersibility, which also make it possible to obtain tires or treads having such an excellent compromise of contradictory properties.

Although the use of these specific, highly reinforcing, siliceous or aluminous inorganic fillers has reduced the difficulties in processing the rubber compositions that contain them, such rubber compositions are nevertheless more difficult to process than rubber compositions filled conventionally with carbon black.

In particular, it is necessary to use a coupling agent, also known as a bonding agent, the function of which is to provide the connection between the surface of the inorganic filler particles and the elastomer, while facilitating the dispersion of this inorganic filler within the elastomeric matrix.

The term "coupling agent" (inorganic filler/elastomer) is understood to mean an agent capable of establishing a sufficient chemical and/or physical connection between the inorganic filler and the elastomer. Such a coupling agent, which is at least bifunctional, has, for example, the simplified general formula "Y-T-X", in which:

Y represents a functional group ("Y function") which is capable of bonding physically and/or chemically with the inorganic filler, where the bond is able to be established, for example, between a silicon atom of the coupling agent and the hydroxyl (OH) surface groups of the inorganic filler (for example, surface silanols in the case of silica);

X represents a functional group ("X function") which is capable of bonding physically and/or chemically with the elastomer, for example by means of a sulfur atom; and T represents a hydrocarbon group making it possible to link Y and X.

The coupling agents must not be confused with simple agents for covering the inorganic filler which, as is known, may comprise the Y function which is active with respect to the inorganic filler but are devoid of the X function which is active with respect to the elastomer.

Silica/elastomer coupling agents in particular have been described in a large number of documents, the best known being bifunctional alkoxysilanes. For example, in French patent application FR 2 094 859, it was proposed to use a mercaptosilane for the manufacture of tire treads It was quickly shown, and is today well known, that the mercaptosilanes, and in particular γ-mercaptopropyltrimethoxysilane or γ-mercaptopropyltriethoxysilane, are capable of giving excellent silica/elastomer coupling properties, but that these coupling agents cannot be used industrially because of the high reactivity of the —SH functions. Specifically, this high reactivity rapidly results in premature vulcanization or "scorching" during the preparation of the rubber composition in an internal mixer, in very high Mooney plasticity values, and in rubber compositions which are virtually impossible to work and process industrially. To illustrate this impossibility of using such coupling agents bearing —SH functions and the rubber compositions that contain them industrially, documents FR 2 206 330 and U.S. Pat. No. 4,002,594 may be cited, for example.

To overcome this drawback, it has been proposed to replace these mercaptosilanes by polysulfurized alkoxysilanes, in particular bis-($C_1$–$C_4$)alkoxysilylpropyl polysulfides such as those described in numerous patents or patent applications. (See, for example, FR 2 206 330 or U.S. Pat. Nos. 3,842,111; 3,873,489; 3,978,103; and 3,997,581.) These polysulfurized alkoxysilanes are generally considered to be the products which, for vulcanized rubber compositions filled with silica, give the best compromise in terms of resistance to scorching, processability and reinforcing power. These polysulfides include, for example, bis-3-triethoxysilylpropyl disulfide (abbreviated to TESPD), more particularly bis-3-triethoxysilylpropyl tetrasulfide (abbreviated to TESPT), which is known as an (inorganic filler/diene elastomer) coupling agent which is effective (and frequently used) in rubber compositions for tires, in particular those intended to form treads. TESPT is sold, for example, by Degussa under the name "Si69".

SUMMARY OF THE INVENTION

It has been discovered that the use of a 1,2-dihydropyridine in a small quantity, in combination with a guanidine derivative, has the unexpected effect of activating the coupling function of the polysulfurized alkoxysilanes, and thereby increasing the effectiveness of the polysulfurized alkoxysilanes.

Due to this activation, it is possible to substantially reduce the quantity of polysulfurized alkoxysilanes which is usually used. This is particularly advantageous because these alkoxysilanes are very expensive and must be used in a large quantity, of the order of two to three times more than the quantity of γ-mercaptopropyltrialkoxysilanes necessary to obtain levels of equivalent coupling properties. These well-known disadvantages have been described, for example, in U.S. Pat. Nos. 5,652,310; 5,684,171; and 5,684,172. Thus, the overall cost of the rubber compositions can be significantly reduced, as can that of the tires containing them.

Consequently, a first object of the present invention relates to a rubber composition which can be used for the manufacture of tires, where the rubber composition is based on a diene elastomer, a reinforcing inorganic filler, and a coupling system. The coupling system comprises a polysulfurized alkoxysilane coupling agent (inorganic filler/diene elastomer) associated with a 1,2-dihydropyridine and a guanidine derivative.

Another object of the present invention is the use of a rubber composition according to the invention for the manufacture of rubber articles, in particular, tires or semi-finished products intended for such tires. These semi-finished products for tires may include treads, underlayers intended, for example, to be positioned beneath these treads, crown plies, sidewalls, carcass plies, beads, protectors, inner tubes and airtight internal rubbers for tubeless tires.

The present invention relates more particularly to the use of such a rubber composition for the manufacture of the sidewalls or treads, because of the good hysteresis properties of the rubber composition.

The invention also relates to a process for the preparation of a composition according to the invention, where the process includes incorporating, by kneading into a diene elastomer, a reinforcing inorganic filler, and a coupling system, where the coupling system comprises a polysulfurized alkoxysilane coupling agent (inorganic filler/diene elastomer) associated with a 1,2-dihydropyridine, and a guanidine derivative. The entire mixture is kneaded thermomechanically, in one or more steps, until a maximum temperature of between 120° C. and 190° C. is reached.

The composition according to the invention is particularly suitable for the manufacture of treads for tires intended to be fitted on passenger vehicles, 4×4 vehicles, vans, two-wheelers and heavy vehicles, aircraft, or construction, agricultural or handling machinery. Also, these treads are useful in the manufacture of new tires or for recapping worn tires.

The present invention further provides for tires and semi-finished rubber products, where the tires and semi-finished rubber products comprise a rubber composition according to the present invention.

The present invention relates in particular to treads for tires. Because of the rubber compositions of the present invention, these treads have both low rolling resistance and high wear resistance, even in the presence of a reduced amount of polysulfurized alkoxysilane coupling agent.

The invention also relates to a coupling system (inorganic filler/diene elastomer) for a diene rubber composition based on a diene elastomer reinforced by an inorganic filler, useful for the manufacture of tires, where the coupling system comprises a polysulfurized alkoxysilane coupling agent in association with a 1,2-dihydropyridine and a guanidine derivative.

A further object of the present invention is the use of such a coupling system (inorganic filler/diene elastomer) in a rubber composition for a tire.

The present invention further discloses the use, in combination, of a 1,2-dihydropyridine and a guanidine derivative, in a rubber composition reinforced by an inorganic filler, for activating the (inorganic filler/diene elastomer) coupling function of the polysulfurized alkoxysilanes.

Still another object of the present invention is a process for coupling an inorganic filler and a diene elastomer, in a rubber composition, where the process includes incorporating a diene elastomer, a reinforcing inorganic filler, a polysulfurized alkoxysilane, a 1,2-dihydropyridine, and a guanidine derivative, where the end mixture is kneaded thermomechanically, in one or more stages, until a maximum temperature of between 120° C. and 190° C. is reached.

BRIEF DESCRIPTION OF THE DRAWINGS

The invention and its advantages will be readily understood in the light of the description and example embodiments which follow, and of the accompanying drawings, wherein.

DETAILED DESCRIPTION OF THE INVENTION

Figure 1:
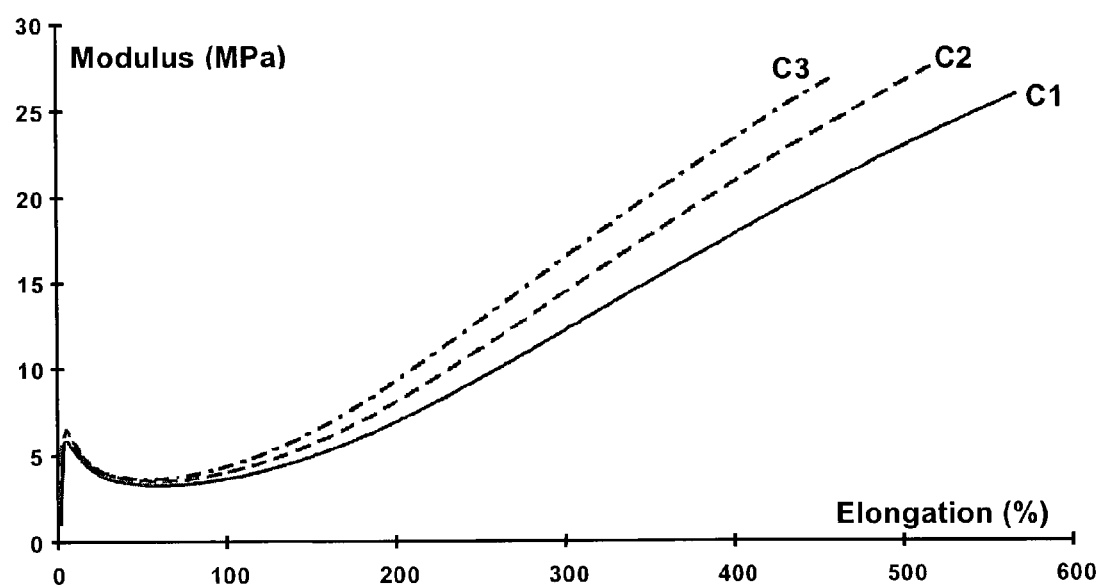
FIG. 1 shows curves of the variation of modulus (in MPa) as a function of elongation (in %) for rubber compositions C1, C2, and C3.

The present invention is further described below with respect to certain specific embodiments.

The measurements made and tests used to characterize the rubber compositions of the present invention are described below. The rubber compositions are characterized before and after curing, as indicated below.

Mooney Plasticity Test: An oscillating consistometer such as that described in standard AFNOR-NFT-43005 (November 1980) is used. The Mooney plasticity is measured in accordance with the following principle: the composition in the uncured state (i.e. before curing) is molded in a cylindrical enclosure heated to 100° C. After one minute of preheating, the rotor turns within the test sample at 2 rpm, and the torque used for maintaining this movement is measured after 4 minutes of rotation. The Mooney plasticity (ML 1+4) is expressed in "Mooney units" (MU, where 1 MU=0.83 Newton meters).

Scorching Time Test: The measurements are effected at 130° C., in accordance with standard AFNOR-NFT-43004 (November 1980). The evolution of the consistometric index as a function of time makes it possible to determine the scorching time for the rubber compositions, assessed in accordance with the above standard by the parameter T5, which is expressed in minutes and is defined as the time necessary to obtain an increase in the consistometric index (expressed in MU) of 5 units above the minimum value measured for this index.

Tensile Tests: These tensile tests make it possible to determine the elasticity stresses and the properties at break. Unless indicated otherwise, these tests are effected in accordance with standard AFNOR-NFT-46002 of September 1988. The nominal secant moduli (in MPa) at 10% elongation (M10), at 100% elongation (M100), and at 300% elongation (M300) are measured in a second elongation (i.e. after an accommodation cycle). The breaking stresses (in MPa) and the elongations at break (in %) are also measured. All these tensile measurements are effected under normal conditions of temperature and humidity in accordance with standard AFNOR-NFT-40101 (December 1979).

Processing the tensile data recorded also makes it possible to trace the curve of the modulus as a function of the elongation as shown in FIGS. 1–9, described in more detail below. The modulus used here is the true secant modulus measured in a first elongation, calculated with respect to the real cross-section of the test piece, and not to the initial section as previously for the nominal moduli.

Hysteresis Loss Test: The hysteresis losses (HL) are measured by rebound at 60° C. at the sixth impact, and are expressed in % in accordance with the following equation (where $W_0$=energy supplied; and $W_1$=energy restored):

$$HL(\%) = 100[(W_0 - W_1)/W_0]$$

The rubber compositions according to the present invention are based on the following constituents: (i) at least one diene elastomer (component A), (ii) at least one inorganic filler as the reinforcing filler (component B), (iii) at least one polysulfurized alkoxysilane, referred to herein as "PSAS" (component C) as the (inorganic filler/diene elastomer) coupling agent, with which there are associated, in order to activate the coupling, (iv) at least one 1,2-dihydropyridine, referred to herein as "1,2-DHP" (component D) and (v) at least one guanidine derivative (component E).

The expression "composition based on" is to be understood to mean a composition comprising the mix and/or the product of reaction in situ of the various constituents used, some of these constituents being liable to, or intended to, react together, at least in part, during the different phases of manufacture of the composition, in particular during the vulcanization thereof.

The coupling system according to the invention comprises a PSAS coupling agent, where the PSAS coupling agent preferably makes up more than 50% by weight of the coupling system, and of a coupling activator formed by the association of a 1,2-DHP and a guanidine derivative.

As is known, the term "diene" elastomer or rubber is understood to mean an elastomer resulting, at least in part (i.e., a homopolymer or a copolymer) from diene monomers (monomers bearing two double carbon-carbon bonds, whether conjugated or not).

In general, "essentially unsaturated" diene elastomer is understood here to mean a diene elastomer resulting at least in part from conjugated diene monomers, having a content of members or units of diene origin (conjugated dienes) which is greater than 15% (mol %).

Thus, for example, diene elastomers such as butyl rubbers or copolymers of dienes and of alpha-olefins of the EPDM type do not fall within the preceding definition, and may, in particular, be described as "essentially saturated" diene elastomers (having a low content of units of diene origin which is less than 15%).

Within the category of "essentially unsaturated" diene elastomers, "highly unsaturated" diene elastomer is understood to mean, in particular, a diene elastomer having a content of units of diene origin (conjugated dienes) which is greater than 50%.

These definitions being given, the following are understood to be a diene elastomer capable of being used in the compositions according to the present invention:

(a)—any homopolymer obtained by polymerization of a conjugated diene monomer having 4 to 12 carbon atoms;

(b)—any copolymer obtained by copolymerization of one or more dienes conjugated together or with one or more vinyl aromatic compounds having 8 to 20 carbon atoms;

(c)—a ternary copolymer obtained by copolymerization of ethylene, of an α-olefin having 3 to 6 carbon atoms, and of a non-conjugated diene monomer having 6 to 12 carbon atoms, such as, for example, the elastomers obtained from ethylene and from propylene, such as, in particular, 1,4-hexadiene, ethylidene norbornene or dicyclopentadiene; and (d)—a copolymer of isobutene and isoprene (butyl rubber), and the halogenated, in particular, chlorinated or brominated, versions of this type of copolymer.

Although the present invention applies to any type of diene elastomer, the person skilled in the art of tires will understand that the present invention, in particular when the rubber composition is intended for a tire tread, is used first and foremost with essentially unsaturated diene elastomers, in particular those of type (a) or (b) above.

Suitable conjugated dienes are, in particular, 1,3-butadiene, 2-methyl-1,3-butadiene, 2,3-di($C_1$–$C_5$ alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, and aryl-1,3-butadiene, 1,3-pentadiene and 2,4-hexadiene. Suitable vinyl aromatic compounds are, for example, styrene, ortho-, meta- and para-methylstyrene, the commercial mixture "vinyltoluene", para-tert-butylstyrene, methoxystyrenes, chlorostyrenes, vinylmesitylene, divinylbenzene and vinylnaphthalene.

The copolymers may contain between 99% and 20% by weight of diene units and between 1% and 80% by weight of vinyl aromatic units. The elastomers may have any microstructure, which is a function of the polymerization conditions used, in particular, of the presence or absence of a modifying and/or randomizing agent and the quantities of modifying and/or randomizing agent used. The elastomers may, for example, be block, statistical, sequential or microsequential elastomers, and may be prepared in dispersion or in solution; they may be coupled and/or starred or alternatively functionalized with a coupling and/or starring or functionalizing agent.

Polybutadienes are preferably suitable, and in particular those having a content of 1,2-units of between 4% and 80%, or those having a cis-1,4 content of more than 80%, polyisoprenes, butadiene-styrene copolymers, and, in particular, those having a styrene content of between 5% and 50% by weight and, more particularly, between 20% and 40%, a content of 1,2-bonds of the butadiene part of between 4% and 65%, and a content of trans-1,4 bonds of between 20% and 80%, butadiene-isoprene copolymers, and, in particular, those having an isoprene content of between 5% and 90% by weight and a glass transition temperature ($T_g$) of −40° C. to −80° C., isoprene-styrene copolymers and, in particular, those having a styrene content of between 5% and 50% by weight and a $T_g$ of between −25° C. and −50° C. In the case of butadiene-styrene-isoprene copolymers, those which are suitable are, in particular, those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene part of between 4% and 85%, a content of trans-1,4 units of the butadiene part of between 6% and 80%, a content of 1,2- plus 3,4-units of the isoprene part of between 5% and 70%, and a content of trans-1,4 units of the isoprene part of between 10% and 50%, and more generally any butadiene-styrene-isoprene copolymer having a $T_g$ of between −20° C. and −70° C.

In summary, in preferred embodiments, the diene elastomer of the composition according to the invention is selected from the group of highly unsaturated diene elastomers which consists of polybutadienes (BR), polyisoprenes (IR), or natural rubber (NR), butadiene copolymers, isoprene copolymers and mixtures of these elastomers. Such copolymers are more preferably selected from the group which consists of butadiene-styrene copolymers (SBR), butadiene-isoprene copolymers (BIR), isoprene-styrene copolymers (SIR) and isoprene-butadiene-styrene copolymers (SBIR).

The composition according to the invention is particularly intended for a tread for a tire, where the tread is for a new or a used tire (recapping).

In the case of a passenger-car tire, component A is, for example, an SBR or an SBR/BR, SBR/NR (or SBR/IR), or alternatively BR/NR (or BR/IR) blend or mixture. In the case of an SBR elastomer, in particular, an SBR having a styrene content of between 20% and 30% by weight, a content of vinyl bonds of the butadiene part of between 15% and 65%, a content of trans-1,4 bonds of between 15% and 75%, and a $T_g$ of between −20° C. and −55° C. is used. Such an SBR copolymer, preferably prepared in solution, is possibly used in a mixture with a polybutadiene (BR) having preferably more than 90% cis-1,4 bonds.

In the case of a tire for a utility vehicle, in particular, for a heavy vehicle (i.e., subway, bus, road transport machinery (lorries, tractors, trailers), off-road vehicles), component A is selected, for example, from the group consisting of natural rubber, synthetic polyisoprenes, isoprene copolymers (isoprene-butadiene, isoprene-styrene, butadiene-styrene-isoprene) and mixtures of these elastomers. In such a case, component A may also comprise, in while or in part, another highly unsaturated elastomer such as, for example, an SBR elastomer.

According to another advantageous embodiment of the invention, in particular, when it is intended for a tire sidewall, the composition according to the invention may contain at least one essentially saturated diene elastomer, in particular at least one EPDM copolymer, whether this copolymer be used or not used, for example, in a mixture with one or more of the highly unsaturated diene elastomers mentioned above.

The compositions of the present invention may contain a single diene elastomer or a mixture of several diene elastomers, the diene elastomer or elastomers possibly being used in association with any type of synthetic elastomer other than a diene elastomer, or even with polymers other than elastomers, for example thermoplastic polymers.

The white or inorganic filler used as the reinforcing filler may constitute all or only part of the total reinforcing filler, in this latter case associated, for example, with carbon black.

Preferably, in the rubber compositions according to the invention, the reinforcing inorganic filler constitutes more than 50% by weight of the total reinforcing filler, more preferably, more than 80% by weight of the total reinforcing filler.

In the present application, "reinforcing inorganic filler", in known manner, is understood to mean an inorganic or mineral filler, whatever its color and its origin (natural or synthetic), which may also be referred to as a "white" filler or a "clear" filler (in contrast to carbon black). This inorganic filler is capable, on its own, without any other means than an intermediate coupling agent, of reinforcing a rubber composition intended for the manufacture of tires. Thus, the inorganic filler is capable of replacing a conventional tire-grade carbon black filler in its reinforcement function.

Preferably, the reinforcing inorganic filler is a mineral filler of the siliceous or aluminous type, or a mixture of these two types of fillers.

The silica ($SiO_2$) used may be any reinforcing silica known to the person skilled in the art, in particular, any precipitated or pyrogenic silica having a BET surface area and a specific CTAB surface area both of which are less than 450 $m^2/g$, preferably from 30 to 400 $m^2/g$. Highly dispersible precipitated silicas (referred to as "HDS") are preferred, in particular when the invention is used for the manufacture of tires having a low rolling resistance. "Highly dispersible silica" is understood in known manner to mean any silica having a substantial ability to disagglomerate and to disperse in an elastomeric matrix, which can be observed in known manner by electron or optical microscopy on thin sections. Non-limiting examples of such preferred highly dispersible silicas include the silicas BV3380 and Ultrasil 7000 from Degussa, the silicas Zeosil 1165 MP and 1115 MP from Rhodia, the silica Hi-Sil 2000 from PPG, the silicas Zeopol 8715 or 8745 from Huber, and treated precipitated silicas such as, for example, the aluminium-"doped" silicas described in application EP 0 735 088.

The reinforcing alumina ($Al_2O_3$) preferably used is a highly dispersible alumina having a BET surface area from 30 to 400 $m^2/g$, more preferably between 60 and 250 $m^2/g$, an average particle size of no more than 500 nm, more preferably of no more than 200 nm, as described in the aforementioned application EP 0 810 258. Non-limiting examples of such reinforcing aluminas include, in particular, the aluminas A125 or CR125 (from Baïkowski), APA-100RDX (from Condea), Aluminoxid C (from Degussa) or AKP-G015 (Sumitomo Chemicals). The present invention can also be implemented by using as reinforcing inorganic filler the specific aluminium (oxide-)hydroxides such as those described in application WO 99/28376.

The physical state in which the reinforcing inorganic filler is present is immaterial, whether it be in the form of a powder, microbeads, granules or balls. "Reinforcing inorganic filler" is also understood to mean mixtures of different reinforcing inorganic fillers, in particular, of highly dispersible siliceous and/or aluminous fillers such as those described above.

When the rubber compositions of the present invention are used as treads for tires, the reinforcing inorganic filler used, in particular if it is silica, preferably has a BET surface area of between 60 and 250 $m^2/g$, more preferably between 80 and 230 $m^2/g$.

The reinforcing inorganic filler may also be used in a blend or mixture with carbon black. Suitable carbon blacks include any carbon black, in particular the blacks of the type HAF, ISAF and SAF, which are conventionally used in tires, and particularly in treads for these tires. Non-limiting examples of such blacks include the blacks N115, N134, N234, N339, N347 and N375. The amount of carbon black present in the total reinforcing filler may vary within wide limits, where the amount preferably is less than the amount of reinforcing inorganic filler present in the rubber composition.

Preferably, the amount of total reinforcing filler (reinforcing inorganic filler plus carbon black, if applicable) lies in a range from 20 to 300 phr, more preferably from 30 to 150 phr, even more preferably from 50 to 130 phr (parts by weight to one hundred parts of elastomer), where the optimum amount differs according to the nature of the reinforcing inorganic filler used and the intended applications. For example, the level of reinforcement expected of a bicycle tire, is known to be distinctly lower than that required for a tire capable of travelling at a sustained high speed, for example a motorcycle tire, a passenger-vehicle tire or a tire for a utility vehicle such as a heavy vehicle.

For treads for tires which are liable to travel at high speed, the quantity of reinforcing inorganic filler, in particular if it is silica, is preferably within a range from 50 to 100 phr.

In the present specification, the BET specific surface area is determined in accordance with the method of Brunauer et al., *Journal of the American Chemical Society*, vol. 60, page 309 (February 1938), which corresponds to Standard AFNOR-NFT-45007 (November 1987). The CTAB specific surface area is the external surface area determined in accordance with the same Standard AFNOR-NFT-45007 of November 1987.

The coupling agent used in the rubber compositions according to the invention is a PSAS, which bears, in known manner, two types of functions referred to herein as "Y" and "X", where the coupling agent can be grafted firstly on the inorganic filler by means of the "Y" function (alkoxysilyl function) and secondly on the elastomer by means of the "X" function (sulfur function).

PSAS are widely known to the person skilled in the art as (inorganic filler/diene elastomer) coupling agents in rubber compositions intended for the manufacture of tires. In particular polysulfurized alkoxysilanes, which are referred to as "symmetrical" or "asymmetrical" depending on their specific structure, have been described in U.S. Pat. Nos. 3,842,111; 3,873,489; 3,978,103; 3,997,581; 4,002,594; 4,072,701; 4,129,585; or in the more recent patents or patent applications 5,580,919; 5,583,245; 5,650,457; 5,663,358; 5,663,395; 5,663,396; 5,674,932; 5,675,014; 5,684,171; 5,684,172; 5,696,197; 5,708,053; 5,892,085; and EP 1 043 357, which describe such known compounds in detail.

Particularly suitable for implementing the invention, without the definition below being limiting, are so-called "symmetrical" PSAS, which satisfy the following general formula (I):

$$Z-A-S_n-A-Z, \text{ wherein} \qquad (I)$$

n is an integer from 2 to 8 (preferably from 2 to 5); A is a divalent hydrocarbon radical; and Z corresponds to one of the formulae below:

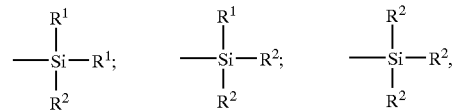

wherein:

the radicals $R^1$, which may or may not be substituted, and may be identical or different, represent a $C_1$–$C_{18}$ alkyl group, a $C_5$–$C_{18}$ cycloalkyl group, or a $C_6$–$C_{18}$ aryl group; and the radicals $R^2$, which may or may not be substituted, and may be identical or different, represent a $C_1$–$C_{18}$ alkoxy group or a $C_5$–$C_{18}$ cycloalkoxyl group.

In the case of a mixture of PSAS in accordance with formula (I) above, in particular conventional, commercially available mixtures, it will be understood that the average value of n is a fractional number, preferably from 2 to 5.

The radical A, whether substituted or not, is preferably a divalent, saturated or non-saturated hydrocarbon radical, comprising 1 to 18 carbon atoms. In particular $C_1$–$C_{18}$ alkylene groups or $C_6$–$C_{12}$ arylene groups, more particularly $C_1$–$C_{10}$ alkylenes, notably $C_2$–$C_4$ alkylenes, in particular propylene, are suitable.

The radicals $R^1$ are preferably $C_1$–$C_6$ alkyl, cyclohexyl or phenyl groups, in particular, $C_1$–$C_4$ alkyl groups, more particularly, methyl and/or ethyl. The radicals $R^2$ are preferably $C_1$–$C_8$ alkoxy groups or $C_5$–$C_8$ cycloalkoxyl groups, more particularly methoxyl and/or ethoxyl.

Preferably, the PSAS used is a polysulfide, in particular a disulfide or a tetrasulfide, of bis(($C_1$–$C_4$)alkoxysilyl ($C_1$–$C_{10}$)alkyl), more preferably still of bis(($C_1$–$C_4$)alkoxysilylpropyl), in particular of bis(tri-($C_1$–$C_{10}$)alkoxysilylpropyl), in particular of bis(3-triethoxysilylpropyl) or of bis(3-trimethoxysilylpropyl).

Bis(triethoxysilylpropyl) disulfide, or TESPD, of the formula $[(C_2H_5O)_3Si(CH_2)_3S]_2$, is sold, for example, by Degussa under the names Si266 or Si75 (in the latter case, in the form of a mixture of disulfide (75% by weight) and of polysulfide), or alternatively by Witco under the name Silquest A1589. Bis(triethoxysilylpropyl) tetrasulfide, or TESPT, of the formula $[(C_2H_5O)_3Si(CH_2)_3S_2]_2$, is sold, for example, by Degussa under the name Si69 (or X50S when it is supported to 50% by weight by carbon black), or alternatively by Witco under the name Silquest A1289 (in both cases, a commercial mixture of polysulfides having an average value of n which is close to 4).

Very preferably, TESPT is used. However, one advantageous embodiment of the present invention consists of using TESPD which, although less active than TESPT when it is used on its own, has an effectiveness which is substantially improved by the presence of the 1,2-DHP and the guanidine derivative.

Another example of a PSAS organosilane may include, for example, an organosilane of the oligomeric or polymeric type, such as those described, for example, in applications WO 96/10604 or DE 44 35 311 and corresponding to the formula below:

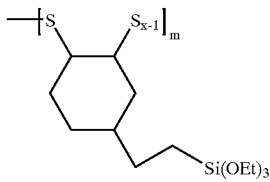

wherein x=1 to 8, m=1 to 200, and OEt represents the ethoxyl radical.

In the rubber compositions according to the invention, the content of PSAS is preferably between 0.5 and 15% by weight relative to the quantity of reinforcing inorganic filler, that is, in the majority of cases, between 1 and 10 phr, more preferably between 3 and 8 phr. However, it is generally desirable to use as little as possible of the PSAS. The presence of the 1,2-DHP and the guanidine derivative in these compositions advantageously makes it possible to use the PSAS in a preferred amount of less than 10%, or even less than 8% by weight relative to the quantity of reinforcing inorganic filler; amounts of between 4 and 8% are thus advantageously possible.

The PSAS could be grafted beforehand (via the "X" function) onto the diene elastomer of the composition of the invention, where the elastomer is thus functionalized or "precoupled" and comprises the free "Y" function for the reinforcing inorganic filler. The PSAS could also be grafted beforehand (via the "Y" function) onto the reinforcing inorganic filler, where the "precoupled" filler is then able to be bonded to the diene elastomer by means of the free "X" function.

However, it is preferred, in particular for reasons of better processing of the compositions in the uncured state, to use the coupling agent either grafted onto the reinforcing inorganic filler, or in the free (i.e., non-grafted) state, just like the 1,2-DHP and the guanidine derivative which are associated therewith in the coupling system according to the invention.

The coupling system according to the invention is formed of the PSAS coupling agent previously defined and a coupling activator for this alkoxysilane. Coupling "activator" is understood herein to mean a body (a compound or an association of compounds) which, when mixed with the coupling agent, increases the effectiveness of the coupling agent.

The coupling activator used according to the present invention is formed by the association of a 1,2-DHP and a guanidine derivative.

Dihydropyridines ("DHP"), in particular the 1,2-dihydropyridines (referred to herein as "1,2-DHP"), are well-known to the person skilled in the art. DHPs have been used essentially as additives in adhesive compositions, stabilizing agents, polymerization activators or vulcanization accelerators. (See, for example, EP 0 334 377; EP 0 502 733; EP 0 794 219; EP 0 867 491; and U.S. Pat. Nos. 4,450,030 and 5,747,601.)

A 1,2-DHP corresponds to the general formula (II) below:

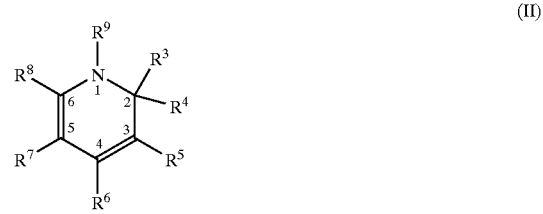

wherein the radicals $R^3$ to $R^9$, which may be identical or different, are preferably selected from hydrogen, a hydrocarbon group, the groups OH, CN, $NH_2$, SH or halogens.

The radicals $R^3$ to $R^9$ are more preferably selected from among hydrogen and hydrocarbon groups having preferably 1 to 20 carbon atoms, these groups possibly being straight-chain, cyclical or branched, and substituted or non-substituted.

Examples of such hydrocarbon groups may include $C_1$–$C_{18}$ alkyls, $C_3$–$C_8$ cycloalkyls, $C_7$–$C_{20}$ arylalkyls, $C_6$–$C_{18}$ aryls, $C_7$–$C_{20}$ alkylaryls, $C_2$–$C_{18}$ alkenyls, $C_1$–$C_{18}$ alkoxyls (OR), and the groups SR, $NR_2$, NHR, COR, COOR, COOH, $CONR_2$, CONHR, $CONH_2$, $SiR_3$, $Si(OR)_3$.

More preferably, the radicals $R^3$ to $R^9$ are selected from among hydrogen, $C_1$–$C_{10}$ alkyls (in particular methyl, ethyl, propyl, butyl, pentyl, hexyl, octyl), $C_3$–$C_8$ cycloalkyls (in particular cyclopentyl, cyclohexyl, cycloheptyl), $C_7$–$C_{12}$ arylalkyls (in particular benzyl, phenyl-ethyl), $C_6$–$C_{12}$ aryls (in particular phenyl, naphthyl), $C_7$–$C_{14}$ alkylaryls (in particular toluyl, xylyl, ethyl-phenyl) and $C_2$–$C_{10}$ alkenyls (in particular propenyl, butenyl). Furthermore, two of these radicals $R^3$ to $R^9$ (for example, $R^5$ and $R^7$) could be joined to form a ring in which a heteroatom selected, for example, from among S, O and N, might possibly appear.

The synthesis of 1,2-DHPs was set forth in detail by Kuthan et al., "Development in Dihydropyridine Chemistry," *Ind. Eng. Chem. Prod. Res. Dev.*, 1982, 21, pp. 191–261. They may be obtained from pyridine derivatives, for example, by reduction of the corresponding pyridinium salts or by the Hantzsch process. They are also synthesized in known manner by condensation, in the presence of a catalyst (for example an acid), a primary amine and an aldehyde, the α carbon of the carbonyl function of which bears at least two hydrogen atoms. This reaction is described, for example, in Charman et al., *Chem. Commun.*, 476 (1971) and in Krow et al., *Tetrahedron Lett.*, 3653 (1971). Thus, in the case of such a condensate (aldehyde-amine), the radicals $R^6$, $R^8$ and at least one of the radicals $R^3$ or $R^4$ represent hydrogen.

It is known that the reaction of an aldehyde on an amine, in particular in the case of an aliphatic aldehyde, may result in numerous secondary products due to the great propensity of these aldehydes to condense on themselves (where the aldolization reaction is described, for example, in *Advanced Organic Chemistry*, 4$^{th}$ Edition, by J. March, p. 937, John Wiley & Sons). This is why, when the 1,2-DHP is used in the form of an aldehyde-amine condensate (i.e., a mixture of condensation products of the aldehyde and the amine), it is preferred for the 1,2 -DHP then to represent the majority constituent (i.e., the one having the highest content by weight) of the condensate.

Any primary, aliphatic or aromatic amine comprising from 1 to 18 carbon atoms may be used, for example ethylamine, n-butylamine, n-pentylamine, cyclopentylamine, n-hexylamine, cyclohexylamine, n-octylamine, n-decylamine, n-dodecylamine, n-hexadecylamine, n-octadecylamine, aniline, or toluyl or xylyl amines.

Among the aldehydes, mention may be made of any $C_2$–$C_{12}$ aldehyde (in particular acetaldehyde, propionaldehyde, n-butyraldehyde, pentanal, cyclopentanal, hexanal, cyclohexanal, n-heptanal, n-decanal, n-dodecanal). More preferably, in particular for reasons of purity of the condensates, an aldehyde having a short $C_3$–$C_6$ carbon chain will be selected, such as propionaldehyde, butyraldehyde (butanal), valeraldehyde (pentanal) or hexaldehyde (hexanal).

In accordance with a particularly preferred embodiment of the invention, the 1,2-DHP used is an N-phenyl-1,2-dihydropyridine. Thus, the radical $R^9$ is a phenyl radical, whether substituted or non-substituted. This means that in the case of a condensate (aldehyde/amine), the amine used is a phenylamine (substituted or non-substituted phenyl radical), in particular aniline (non-substituted phenyl).

An example of a 1,2-DHP useful in the compositions of the present invention is 3,5-dipentyl-1,2-dihydro-1-phenyl-2-hexylpyridine, which is available, for example, in the form of a heptaldehyde-aniline condensate, corresponding to formula (II-1) below:

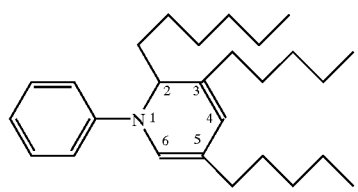

(II-1)

A more preferred example is 3,5-diethyl-1,2-dihydro-1-phenyl-2-propylpyridine, which corresponds to the formula (II-2) below:

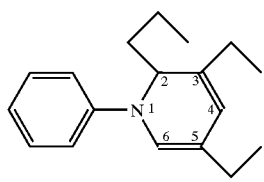

(II-2)

Examples of (aldehyde/amine) condensates that are useful in the compositions of the invention include the heptaldehyde-aniline condensates from Uniroyal Chemical (name "Hepteen Base"), the butyraldehyde-aniline condensates from RT Vanderbilt (for example, name "Vanax 808"—purity of 1,2-DHP approx. 40%) or those from Bayer (for example, name "Vulkacit 576"—purity of 1,2-DHP approx. 30%), where all of these condensates are marketed as vulcanization accelerators.

Preferably, (aldehyde/amine) condensates will be selected which have a content or purity of 1,2-DHP (% by weight) which is as high as possible, preferably greater than 50%, more preferably greater than 70%. A particularly preferred example includes the condensation product of aniline and butyraldehyde which, after purification, consists majoritarily of a 3,5-diethyl-1,2-dihydro-1-phenyl-2-propylpyridine of formula (II-2) above. This product is sold, for example, by the company R. T. Vanderbilt under the name Vanax 808 HP (purity of 1,2-DHP at least 85%).

The person skilled in the art, having taken note of the invention, will be able to adjust the optimum content of 1,2-DHP according to the intended application, the inorganic filler used, and the nature of the elastomer used, where the range is preferably between 0.1 and 3 phr, more preferably between 0.2 and 1 phr. Amounts of 0.2 to 0.6 phr are, for example, advantageously possible for the compositions intended for treads for passenger-vehicle tires.

The optimum content of 1,2-DHP will be selected, first and foremost, as a function of the quantity of PSAS used. Preferably, in the coupling system according to the invention, the quantity of 1,2-DHP represents between 1% and 20% by weight relative to the weight of PSAS; below the minimum amounts indicated, the effect risks being inadequate, whereas beyond the maximum amounts indicated, generally no further improvement in the coupling is observed, whereas the costs of the composition increase, and there is the risk of being exposed to scorching. For the reasons set forth above, the quantity of 1,2-DHP is more preferably between 3% and 17.5% by weight relative to the quantity of PSAS.

Preferably, in the rubber compositions according to the invention, the total quantity of PSAS and of 1,2-DHP represents less than 10%, more preferably between 5% and 10% by weight, relative to the quantity of reinforcing inorganic filler. In the majority of cases, this corresponds to an amount of (PSAS+1,2-DHP) of between 1 and 10 phr, more preferably between 4 and 9 phr.

The second component necessary for activation of the coupling is a guanidine derivative, that is to say a substituted guanidine. Substituted guanidines are well-known to the person skilled in the art, in particular as vulcanization agents, and have been described in numerous documents. (See, for example, *Vulcanization and Vulcanizing Agents* by W. Hofmann, Ed. MacLaren and Sons Ltd. (London), 1967, pp. 180–182; EP 0 683 203 or U.S. Pat. No. 5,569,721.)

In the compositions according to the invention, preferably N,N'-diphenylguanidine (abbreviated to "DPG") is used, which corresponds to the specific formula (III-1) below:

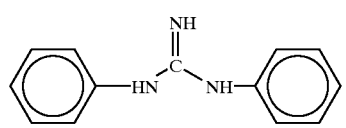

(III-1)

However, guanidine derivatives other than DPG may also be used, particularly other aromatic guanidine derivatives corresponding to the general formula (III) below:

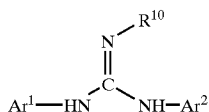

(III)

wherein $Ar^1$ and $Ar^2$ represent a substituted or non-substituted aryl group, preferably a phenyl group, and $R^{10}$ represents a hydrogen or a hydrocarbon group. Examples of compounds corresponding to the general formula (III) above include, in addition to the DPG, which has already been mentioned, triphenylguanidine (TPG) or di-o-tolylguanidine (DOTG) having the formula (III-2):

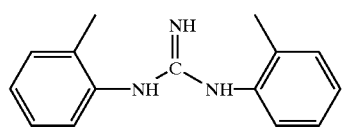

(III-2)

In the compositions according to the invention, the quantity of the guanidine derivative is preferably between 0.5% and 4% relative to the weight of reinforcing inorganic filler, more preferably between 1% and 3%, that is, preferably between 0.25 and 4 phr, more preferably between 0.5 and 2 phr. Below the minimum amounts indicated, the effect of activation risks being inadequate, whereas beyond the maxima indicated, generally no further improvement in the coupling is observed, whereas there is a risk of scorching.

Preferably, in the compositions of the present invention, the coupling system formed by the PSAS and the coupling activator (1,2-DHP+guanidine derivative) represents a total of between 2% and 20%, more preferably between 5% and 15%, by weight, relative to the quantity of reinforcing inorganic filler. In the majority of cases, this coupling system shows sufficiently high performance, for the requirements of the compositions which are intended for the manufacture of tires, in particular those intended for tire treads for passenger vehicles, in an amount less than 12%, or even less than 10%, by weight relative to the quantity of reinforcing inorganic filler. Relative to the weight of diene elastomer, the amount of the coupling system according to the invention is preferably between 2 and 15 phr, more preferably between 5 and 10 phr.

The rubber compositions according to the present invention also contain all or part of the additives usually used in sulfur-cross-linkable diene rubber compositions intended for the manufacture of tires, such as, for example, plasticizers, pigments, protective agents of the type antioxidants, antiozonants, a cross-linking system based either on sulfur or on sulfur donors and/or peroxide and/or bismaleimides, vulcanization accelerators, vulcanization activators, extender oils, etc. There may also be associated with the reinforcing inorganic filler, if necessary, a conventional non-reinforcing white filler, such as particles of clay, bentonite, talc, chalk, kaolin or titanium oxides.

The compositions according to the present invention may also contain, in addition to the PSAS, covering agents (comprising, for example, the single Y function) for the reinforcing inorganic filler or, more generally, processing aids liable, in known manner, owing to an improvement in the dispersion of the inorganic filler in the rubber matrix and to a reduction in the viscosity of the compositions, to improve their ability to be worked in the uncured state. These agents may include, for example, alkylalkoxysilanes (in particular alkyltriethoxysilanes), polyols, polyethers (for example, polyethylene glycols), primary, secondary or tertiary amines, hydroxylated or hydrolyzable polyorganosiloxanes, for example α,ω-dihydroxy-polyorganosiloxanes (in particular, α,ω-dihydroxy-polydimethylsiloxanes). These compositions may also contain coupling agents other than PSAS.

The rubber compositions of the present invention are produced in suitable mixers, in a manner known to the person skilled in the art, typically using two successive preparation phases: a first phase of thermomechanical working at high temperature, followed by a second phase of mechanical working at lower temperature, as described, for example, in the patent applications EP 0 501 227, EP 0 810 258 or WO 99/28376, mentioned above.

The first phase of thermomechanical working (sometimes referred to as the "non-productive" phase) is intended to mix thoroughly, by kneading, the various ingredients of the composition, with the exception of the vulcanization system. It is carried out in a suitable kneading device, such as an internal mixer or an extruder, until, under the action of the mechanical working and the high shearing imposed on the mixture, a maximum temperature of between 120° C. and 190° C., preferably between 130° C. and 180° C., is reached.

This first phase may itself comprise a single or several thermomechanical working stages, separated, for example, by one or more intermediate cooling stages. The various ingredients of the composition, elastomer(s), reinforcing filler and its coupling system, and the various other components ("additives") may be incorporated in the mixer in one or more steps, either during the first thermomechanical stage, or staggered during the various thermomechanical stages, if applicable. The total duration of this thernomechanical working (typically between 1 and 20 minutes, for example, between 2 and 10 minutes) is selected according to the specific operating conditions, in particular the maximum temperature selected, the nature and volume of the constituents, where it is important that a good dispersion of the various ingredients which inter-react is obtained in the elastomeric matrix, thus permitting good processing of the composition in the uncured state, and a sufficient level of reinforcement, after curing, by the reinforcing filler and its intermediate coupling system.

After cooling of the mixture thus obtained, a second phase of mechanical working is then implemented at a lower temperature. Sometimes referred to as the "productive" phase, this finishing phase consists of mixing the vulcanization (or cross-linking) system in a suitable device, for example, an open mill. It is performed for an appropriate time (typically between 1 and 30 minutes, for example, between 2 and 5 minutes) and at a sufficiently low temperature (typically less than 120° C., for example, between 60° C. and 100° C.), in all cases lower than the vulcanization temperature of the mixture, so as to protect against premature vulcanization or scorching.

According to a preferred embodiment of the process according to the present invention, all the base constituents of the compositions according to the invention, namely (ii) the reinforcing inorganic filler and the coupling system according to the invention, which is formed by the association of (iii) the PSAS, (iv) the 1,2-DHP and (v) the guanidine derivative, are incorporated in (i) the diene elastomer during the first non-productive phase. Thus, at least these different base constituents are introduced into the mixer and are kneaded thermomechanically, in one or more stages, until a maximum temperature of between 120° C. and 190° C., preferably between 130° C. and 180° C., is reached.

By way of example, the first non-productive phase is carried out in two successive steps having a duration of 1 to 5 minutes in a conventional internal blade mixer of the "Banbury" type, where the initial tank temperature is about 60° C. First, the elastomer (or the elastomers) is introduced. Then, after, for example, 1 minute of kneading, the reinforcing filler and its associated coupling system is introduced. Kneading is continued and then, for example, 1 minute later, the various additives are added, including any possible complementary covering agents or processing agents, with the exception of the vulcanization system (sulfur and primary accelerator of the sulfenamide type). When the apparent density of the reinforcing filler (or of one of the reinforcing fillers, if several are used) is relatively low (as is the case, for example, of silicas), it may be preferable to divide the introduction of the latter, and, if applicable, that of its coupling system, into several steps in order to facilitate the incorporation thereof in the elastomeric matrix, for example half or even about ¾ of the filler after the first minute of kneading, and the rest after two minutes of kneading. The thermomechanical working is thus carried out until a maximum temperature, referred to as the "dropping" temperature, of, for example, between 150° C. and 170° C. is obtained. The block of mix thus obtained is recovered and is cooled to a temperature of less than 100° C. After cooling, a second thermomechanical stage is carried out in the same or a different mixer, with the aim of subjecting the mix to complementary heat treatment and obtaining, in particular, better dispersion of the reinforcing filler. Some of the additives, such as, for example, the stearic acid, the antiozone wax, the antioxidant, the zinc oxide or other additive, may not be introduced into the mixer, in whole or in part, until this second stage of thermomechanical working. The result of this first thermomechanical phase is then taken up on an external open mill, at low temperature (for example between 30° C. and 60° C.), and the vulcanization system is added. The end composition is then mixed (productive phase) for several minutes, for example, between 2 and 5 minutes.

The final composition thus obtained is then calendered, for example, in the form of a film or a sheet, in particular for characterization in the laboratory, or alternatively extruded, in order to form, for example, a rubber profiled element used for manufacturing semi-finished products such as treads, crown plies, sidewalls, carcass plies, beads, protectors, inner tubes or airtight internal rubbers for tubeless tires.

The vulcanization (or curing) is carried out in a known manner at a temperature generally between 130° C. and 200° C., under pressure, for a sufficient time which may vary, for example, between 5 and 90 minutes, depending, in particular, on the curing temperature, the cross-linking system adopted and the vulcanization kinetics of the composition in question.

The present invention relates to the rubber compositions previously described, both in the "uncured" state (i.e., before curing) and in the "cured" or vulcanized state (i.e., after cross-linking or vulcanization).

The compositions according to the invention may be used alone or in a blend (i.e., in a mixture) with any other rubber composition which can be used for manufacturing tires.

The present invention may be better understood through the Examples below. These Examples are intended to illustrate the invention and should not be construed as limiting the invention in any way.

EXAMPLES

Example 1

Preparation of the Rubber Compositions

For the following tests, two thermomechanical stages are used which are separated by a cooling phase, in the following manner: there are introduced into an internal laboratory mixer (0.4 liters), of the "Banbury" type, filled to 70% and the initial tank temperature of which is approximately 60° C., in succession, the elastomer(s), approximately one minute later ⅔ of the reinforcing inorganic filler and its associated coupling system, one minute later still the rest of the reinforcing filler, its associated coupling system, and the various additives with the exception of the antioxidant, the zinc oxide and the vulcanization system (sulfur and sulfenamide). A first thermomechanical working step is thus performed for about 3 to 4 minutes, until a maximum dropping temperature of about 165° is reached. The elastomeric block is then recovered and cooled. Then, a second stage is carried out in the same mixer with the same conditions: the elastomeric block is then subjected to a second thermomechanical working stage, also of 3 to 4 minutes' duration, with addition of the zinc oxide and the antioxidant, until a maximum dropping temperature of approximately 165° C. is achieved.

The mixture thus obtained is recovered and cooled, and then sulfur and sulfenamide are added on an external mixer (homo-finisher) at 30° C., by mixing everything (productive phase) for 3 to 4 minutes.

The compositions thus obtained are then calendered either in the form of sheets (having a thickness of 2 to 3 mm) or of thin films of rubber in order to measure their physical or mechanical properties, or in the form of profiled elements which can be used directly, after cutting out and/or assembly to the dimensions desired, for example, as semi-finished products for tires, in particular as treads.

In the majority of the tests which follow, the reinforcing white filler (silica and/or alumina) constitutes the reinforcing filler, used in a preferred amount within a range from 50 to 100 phr; however, in these tests, a fraction of the reinforcing filler, preferably a minority fraction, could be replaced by carbon black.

Example 2

Characterization Tests

Test 1: In this first test, three rubber compositions (mixture of SBR and BR diene elastomers) reinforced with silica, which are intended for the manufacture of treads for tires are compared. The SBR elastomer is prepared in solution, and contains 26.5% styrene, 59.5% 1-2-polybutadiene units and 23% trans-1-4-polybutadiene units. The BR elastomer comprises 93% 1-4 cis units.

These three compositions are identical except for the following differences:

Composition No. 1 comprises TESPT (6.4 phr) with DPG but without 1,2-DHP;

Composition No. 2 comprises TESPT (6.4 phr) with which there are associated 0.25 phr (or 3.9% by weight relative to the quantity of TESPT) of 1,2-DHP and 1.5 phr of DPG (or about 1.9% by weight relative to the quantity of reinforcing inorganic filler); and Composition No. 3 comprises TESPT (6.4 phr) with which there are associated 0.5 phr (or 7.8% by weight relative to the quantity of TESPT) of 1,2-DHP and 1.5 phr of DPG.

As component D, the condensate (aniline-butyraldehyde) Vanax 808 HP sold by R. T. Vanderbilt is used here, where this condensate is formed majoritarily of 3,5-diethyl-1,2-dihydro-1-phenyl-2-propylpyridine of formula (11-2) above (declared content of 1,2-DHP at least 85% by weight).

Composition No. 1 is the control for this test and contains an amount of TESPT of 8% by weight relative to the quantity of reinforcing inorganic filler (6.4 phr of TESPT per 80 phr of silica), but is devoid of 1,2-DHP. In Compositions No. 2 and No. 3 according to the invention, the total quantity (PSAS+1,2-DHP) represents less than 10% (respectively, 8.3% and 8.6%) by weight relative to the quantity of reinforcing inorganic filler. The coupling system according to the present invention (TESPT+1,2-DHP+DPG) is advantageously present in an amount of less than 12% (10.2% and 10.5%, respectively) by weight relative to this quantity of reinforcing inorganic filler.

Tables 1 and 2 below show the formulation of the different compositions (where Table 1 shows the amounts of the different products expressed in phr), and their properties before and after curing (40 min at 150° C.).

TABLE 1

| Composition No.: | 1 | 2 | 3 |
|---|---|---|---|
| SBR (1) | 88.5 | 88.5 | 88.5 |
| BR (2) | 25 | 25 | 25 |
| silica (3) | 80 | 80 | 80 |
| aromatic oil | 21.5 | 21.5 | 21.5 |
| TESPT (Si69) | 6.4 | 6.4 | 6.4 |
| 1,2-DHP (4) | — | 0.25 | 0.5 |
| ZnO | 2.5 | 2.5 | 2.5 |
| stearic acid | 2 | 2 | 2 |
| antioxidant (5) | 1.9 | 1.9 | 1.9 |
| DPG (6) | 1.5 | 1.5 | 1.5 |
| sulfur | 1.1 | 1.1 | 1.1 |
| CBS (7) | 2 | 2 | 2 |

(1) Solution SBR with 59.5% of 1,2-polybutadiene units; 26.5% of styrene; $T_g = -29°$ C.; 75 phr SBR extended with 13.5 phr of aromatic oil (or a total of 88.5 phr);
(2) BR with 4.3% of 1-2; 2.7% of trans; 93% of cis 1-4 ($T_g = -106°$ C.);
(3) Silica type "HDS" - Zeosil 1165 MP from Rhodia in the form of microbeads (BET and CTAB: approximately 160 m$^2$/g);
(4) 1,2-DHP of formula II-2 (Vanax 808 HP from R. T. Vanderbilt);
(5) N-1,3-dimethylbutyl-N-phenyl-para-phenylenediamine; (Santoflex 6-PPD from Flexsys);
(6) Diphenylguanidine (Vulkacit D from Bayer);
(7) N-cyclohexyl-2-benzothiazyl sulfenamide (Santocure CBS from Flexsys).

TABLE 2

| Composition No.: | 1 | 2 | 3 |
|---|---|---|---|
| Properties before curing: | | | |
| Mooney (MU) | 90 | 94 | 97 |
| T5 (min) | 20 | 14 | 12 |
| Properties after curing: | | | |
| M10 (MPa) | 4.95 | 5.12 | 4.94 |
| M100 (MPa) | 1.67 | 1.80 | 1.92 |
| M300 (MPa) | 2.14 | 2.46 | 2.79 |
| M300/M100 | 1.28 | 1.37 | 1.45 |
| HL (%) | 28 | 25 | 23 |
| Breaking stress (MPa) | 22.3 | 21.7 | 22.3 |
| Elongation at break (%) | 573 | 492 | 463 |

FIG. 1 shows the curves of modulus (in MPa) as a function of the elongation (in %), where the curves are marked C1, C2, and C3, and correspond to Compositions No. 1, No. 2, and No. 3, respectively.

Examining the results of Table 2 shows that the compositions according to the invention (No. 2 and No. 3), compared with the control Composition No. 1, have, in the uncured state, Mooney viscosities which are little different (and hence equivalent processing properties), a scorching time which is shorter but which remains satisfactory, and substantially improved properties in the cured state. These substantially improved properties in the cured state include: (1) higher moduli at the high deformations (M100 and M300), where the ratio of M300/M100 is also higher (which are, as is known to the person skilled in the art, indicators of greater reinforcement); (2) substantially lower hysteresis losses (HL) (which are indicative of a lower rolling resistance for treads); and (3) equivalent properties at break.

FIG. 1 confirms the above results. For elongations of 100% and more, all the values of modulus are distinctly greater in the case of Compositions No. 2 and No. 3 (curves C2 and C3). For such a range of elongations, such behavior clearly illustrates a better interaction between the reinforcing inorganic filler and the elastomer.

In summary, all the results obtained after curing are representative of better coupling between the reinforcing inorganic filler and the diene elastomer, in other words activation, by the 1,2-DHP and the guanidine derivative in combination, of the coupling function of the PSAS.

Test 2: The object of this test is to show that it is possible, because of the activation provided by the 1,2-DHP and the guanidine derivative, to substantially reduce the quantity of PSAS (TESPT) without adversely affecting the properties of reinforcement of the compositions by the inorganic filler.

Three rubber compositions, which are similar to those of Test 1 above are compared, where these compositions are identical apart from the following differences:

Composition No. 4 comprises TESPT (6.4 phr) with DPG but without 1,2-DHP;

Composition No. 5 comprises TESPT (4 phr) with DPG but without 1,2-DHP; and

Composition No. 6 comprises TESPT (4 phr) plus 0.5 phr of 1,2-DHP (or 12.5% by weight relative to the quantity of TESPT) and 1.5 phr of DPG.

Only Composition No. 6 is therefore in accordance with the present invention; Composition No. 4 is the reference composition of the prior art, and Composition No. 5 represents a control having an identical amount of TESPT compared with composition No. 6. Tables 3 and 4 below show the formulation of the different compositions and their properties before and after curing (150° C., 40 minutes).

TABLE 3

| Composition No: | 4 | 5 | 6 |
|---|---|---|---|
| SBR (1) | 88.5 | 88.5 | 88.5 |
| BR (2) | 25 | 25 | 25 |
| silica (3) | 80 | 80 | 80 |
| aromatic oil | 21.5 | 21.5 | 21.5 |
| TESPT (Si69) | 6.4 | 4 | 4 |
| 1,2-DHP (4) | — | — | 0.5 |
| ZnO | 2.5 | 2.5 | 2.5 |
| stearic acid | 2 | 2 | 2 |
| antioxidant (5) | 1.9 | 1.9 | 1.9 |
| DPG (6) | 1.5 | 1.5 | 1.5 |
| sulfur | 1.1 | 1.1 | 1.1 |
| CBS (7) | 2 | 2 | 2 |

(1) to (7) See Table 1 above.

TABLE 4

| Composition No.: | 4 | 5 | 6 |
|---|---|---|---|
| Properties before curing: | | | |
| Mooney (MU) | 83 | 105 | 108 |
| T5 (min) | 21 | 21 | 17 |
| Properties after curing: | | | |
| M10 (MPa) | 5.34 | 5.62 | 5.37 |
| M100 (MPa) | 1.73 | 1.46 | 1.60 |
| M300 (MPa) | 2.2 | 1.59 | 2.06 |
| M300/M100 | 1.27 | 1.09 | 1.29 |
| HL (%) | 28 | 33.5 | 28 |
| Breaking stress (MPa) | 22.5 | 22.3 | 23.9 |
| Elongation at break (%) | 526 | 661 | 573 |

Figure 2:
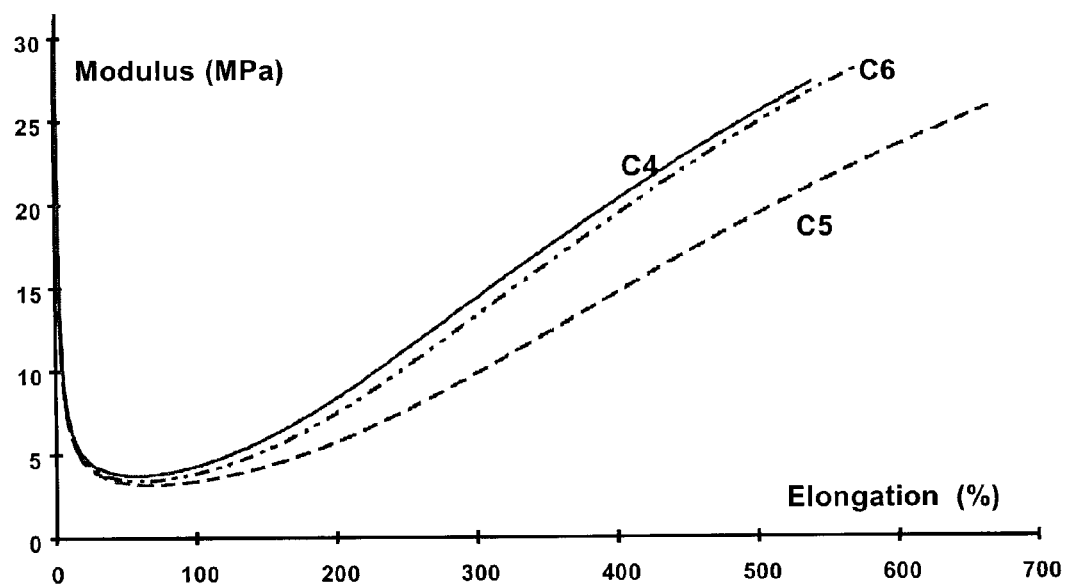
FIG. 2 shows curves of the variation of modulus (in MPa) as a function of elongation (in %) for rubber compositions C4, C5, and C6.

FIG. 2 shows the curves of modulus (in MPa) as a function of the elongation (in %), where these curves are marked C4 to C6 and correspond to Compositions Nos. 4 to 6, respectively.

In Composition No. 4 according to the prior art, the amount of TESPT represents 8% by weight relative to the quantity of silica, which is greater by 60% than the amount of TESPT used in Composition No. 6 in accordance with the invention.

In Composition No. 6, the quantity of PSAS, like the total quantity of (PSAS+1,2-DHP) represents less than 6% (respectively, 5% and 5.6%) by weight relative to the quantity of reinforcing inorganic filler. As for the coupling system itself, (PSAS+1,2-DHP+DPG), it is present in an amount advantageously of less than 10% (precisely, 7.5%) by weight relative to this same quantity.

A study of the different results shows that Composition No. 6 according to the present invention, compared first with reference Composition No. 4, has equivalent performance after curing, despite a significantly lower amount of TESPT, and compared secondly with the control Composition No. 5, containing the same quantity of TESPT, but devoid of 1,2-DHP, overall superior performance. The observations included the following: (1) moduli at the high deformations (M100, M300) and a ratio of M300/M100 virtually identical to those of the reference Composition No. 4, and significantly greater than those of the control Composition No. 5; (2) hysteresis losses (HL) identical for Compositions No. 4 and No. 6, and furthermore significantly less than those of Composition No. 5; and (3) equivalent properties at break.

FIG. 2 confirms the effect of activation of the coupling provided by the 1,2-DHP and the DPG. It can clearly be seen that the values of modulus, for elongations of 100% and more, are substantially identical for Compositions No. 4 and No. 6 (curves C4 and C6 are very close), are clearly greater than those observed on the control Composition No. 5.

It is thus possible to reduce very substantially (from 6.4 phr to 4 phr) the quantity of TESPT in the rubber compositions according to the invention, while keeping the reinforcement properties at a substantially identical level.

Although the reduction in the amount of silane, as expected, involves an increase in the viscosity in the uncured state, the variations observed remain acceptable. In particular, the person skilled in the art will be able to correct, if necessary, the increase in viscosity in the uncured state by the addition of a small quantity of covering agent. (See Test 10 described below.)

Test 3: This test shows that it is possible, because of the activation provided by a 1,2-DHP and a guanidine derivative, to replace a tetrasulfurized alkoxysilane (TESPT) with a disulfurized alkoxysilane (TESPD), which is known to be less active than the former, practically without adversely affecting the properties of the rubber compositions.

Three rubber compositions similar to those of Tests 1 and 2 above are compared, where these three compositions are identical except for the following differences:

Composition No. 7 comprises TESPT (6.4 phr) (with guanidine derivative but without 1,2-DHP);

Composition No. 8 comprises TESPD (5.6 phr) (with guanidine derivative but without 1,2-DHP); and Composition No. 9 comprises TESPD (5.6 phr) plus 0.5 phr of 1,2-DHP (or 8.9% by weight relative to the quantity of TESPD) and 1.5 phr of guanidine derivative.

Composition No. 7 is the control for this test (8% of TESPT relative to the weight of reinforcing inorganic filler); Composition No. 8, which is also not in accordance with the invention, contains the TESPD in an isomolar amount relative to the amount of TESPT, that is to say that for the two Compositions No. 7 and No. 8, the same amount of triethoxysilane functions reactive in relation to the silica and to its hydroxyl surface groups is used. Composition No. 9 is the only composition according to the invention, where the amount of PSAS represents less than 8% (precisely, 7%) by weight relative to the quantity of silica (80 phr) and the quantity of (TESPD+1,2-DHP) represents less than 8% (precisely, 7.6%) relative to this same quantity; as for the coupling system according to the invention (TESPD+1,2-DHP+DPG), the amount thereof advantageously represents less than 10% (precisely, 9.5%) by weight relative to the quantity of reinforcing inorganic filler.

Tables 5 and 6 below show the formulation of the different compositions, and their properties before and after curing (150° C., 40 minutes).

TABLE 5

| Composition No.: | 7 | 8 | 9 |
|---|---|---|---|
| SBR (1) | 88.5 | 88.5 | 88.5 |
| BR (2) | 25 | 25 | 25 |
| silica (3) | 80 | 80 | 80 |
| aromatic oil | 21.5 | 21.5 | 21.5 |
| TESPT (Si69) | 6.4 | — | — |
| TESPD (Si266) | — | 5.6 | 5.6 |
| 1.2-DHP (4) | — | — | 0.5 |
| ZnO | 2.5 | 2.5 | 2.5 |
| stearic acid | 2 | 2 | 2 |
| antioxidant (5) | 1.9 | 1.9 | 1.9 |
| DPG (6) | 1.5 | 1.5 | 1.5 |
| sulfur | 1.1 | 1.1 | 1.1 |
| CBS (7) | 2 | 2 | 2 |

(1) to (7) See Table 1 above.

TABLE 6

| Composition No.: | 7 | 8 | 9 |
|---|---|---|---|
| Properties before curing: | | | |
| Mooney (MU) | 90 | 88 | 97 |
| T5 (min) | 19 | 26 | 14 |
| Properties after curing: | | | |
| M10 (MPa) | 5.51 | 5.43 | 5.58 |
| M100 (MPa) | 1.71 | 1.35 | 1.55 |
| M300 (MPa) | 2.11 | 1.42 | 1.81 |
| M300/M100 | 1.23 | 1.05 | 1.17 |
| HL (%) | 29 | 34 | 31 |
| Breaking stress (MPa) | 22.6 | 21.4 | 22.4 |
| Elongation at break (%) | 599 | 733 | 636 |

Figure 3:
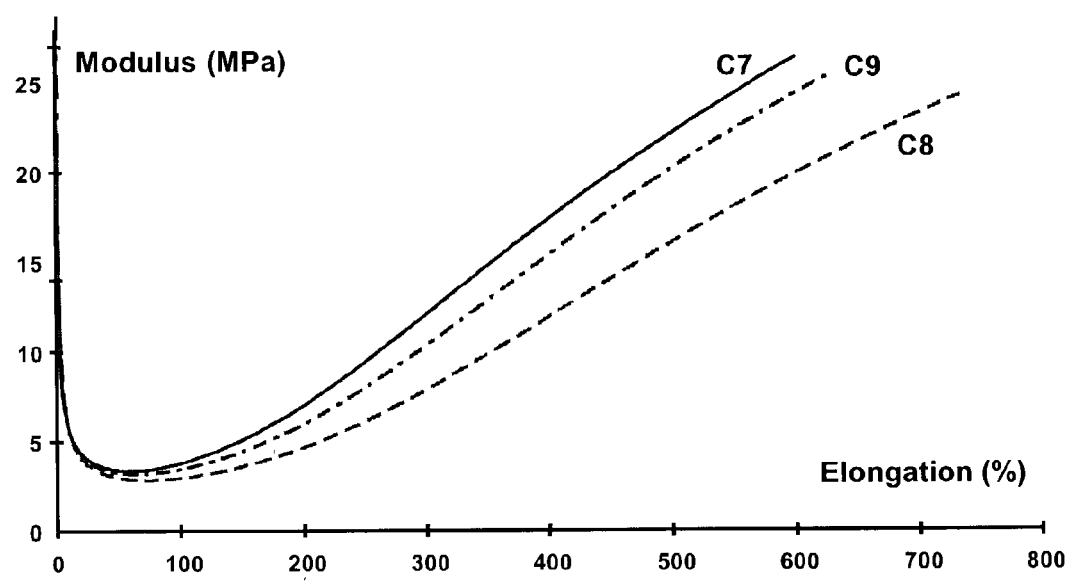
FIG. 3 shows curves of the variation of modulus (in MPa) as a function of elongation (in %) for rubber compositions C7, C8, and C9.

FIG. 3 shows the curves of modulus (in MPa) as a function of the elongation (in %), where these curves are marked C7 to C9 and correspond to Compositions No. 7 to No. 9, respectively.

It will be noted that Composition No. 8, compared with composition No. 7, has reinforcement properties after curing (M100, M300 and ratio of M300/M100) which are clearly inferior, a lesser breaking strength as well as greater hysteresis losses. All of this is due to the lower effectiveness of coupling (inorganic filler/elastomer) of the disulfurized alkoxysilane (TESPD) compared with the tetrasulfurized alkoxysilane (TESPT).

However, because of the addition of a small quantity of 1,2-DHP to Composition No. 9, a very significant increase in the reinforcement properties (M100, M300, ratio of M300/M100, and breaking stress) and a reduction in the HL is noted, where these properties are brought back to levels close to those observed for Composition No. 7. This effectiveness of the 1,2-DHP combined with the guanidine derivative, as a coupling activator for the TESPD, is also clearly illustrated by the curves of FIG. 3, where curves C7 and C9 are close and are located, for elongations greater than 100%, well beyond curve C8.

Test 4: This test confirms the preceding results, in particular those of Test 1, using a 1,2-DHP of different origin, available in the form of a heptaldehyde-aniline condensate, the majority constituent of which is a 1,2-DHP (product sold by Uniroyal Chemical under the name "Hepteen Base").

These two compositions are identical except for the following differences:

Composition No. 10 comprises TESPT (6.4 phr) with DPG (1.5 phr) but without 1,2-DHP; and
Composition No. 11 comprises TESPT (6.4 phr) with DPG (1.5 phr) plus 0.5 phr of 1,2-DHP (or 7.8% by weight relative to the quantity of TESPT).

Each composition comprises 1.5 phr of guanidine derivative, or about 1.9% by weight relative to the quantity of reinforcing inorganic filler. Composition No. 10 is the control for this test and contains an amount of TESPT of 8% by weight relative to the quantity of reinforcing inorganic filler (6.4 phr of TESPT per 80 phr of silica), but is devoid of 1,2-DHP. In Composition No. 11, according to the present invention, the quantity of alkoxysilane and of 1,2-DHP represents less than 10% (precisely, 8.6%) by weight relative to the quantity of reinforcing inorganic filler. As for the coupling system according to the invention (TESPT+1,2-DHP+DPG), it is advantageously present in an amount of less than 12% (precisely, 10.5%) by weight relative to the quantity of reinforcing inorganic filler.

Tables 7 and 8 below show the formulation of the different compositions (where Table 7 shows the amounts of the different products expressed in phr) and their properties before and after curing (40 min at 150° C.).

TABLE 7

| Composition No: | 10 | 11 |
|---|---|---|
| SBR (1) | 88.5 | 88.5 |
| BR (2) | 25 | 25 |
| silica (3) | 80 | 80 |
| aromatic oil | 21.5 | 21.5 |
| TESPT (Si69) | 6.4 | 6.4 |
| 1,2-DHP (8) | — | 0.5 |
| ZnO | 2.5 | 2.5 |
| stearic acid | 2 | 2 |
| antioxidant (5) | 1.9 | 1.9 |
| DPG (6) | 1.5 | 1.5 |

TABLE 7-continued

| Composition No: | 10 | 11 |
|---|---|---|
| sulfur | 1.1 | 1.1 |
| CBS (7) | 2 | 2 |

(1) to (7) See Table 1 above;
(8) Condensate "Hepteen base" (Uniroyal Chemical).

TABLE 8

| Composition No.: | 10 | 11 |
|---|---|---|
| Properties before curing: | | |
| Mooney (MU) | 83 | 86 |
| T5 (min) | 21 | 15 |
| Properties after curing: | | |
| M10 (MPa) | 5.34 | 5.36 |
| M100 (MPa) | 1.73 | 1.86 |
| M300 (MPa) | 2.20 | 2.50 |
| M300/M100 | 1.27 | 1.34 |
| HL (%) | 28 | 25 |
| Breaking stress (MPa) | 22.5 | 22.6 |
| Elongation at break (%) | 526 | 492 |

Figure 4:
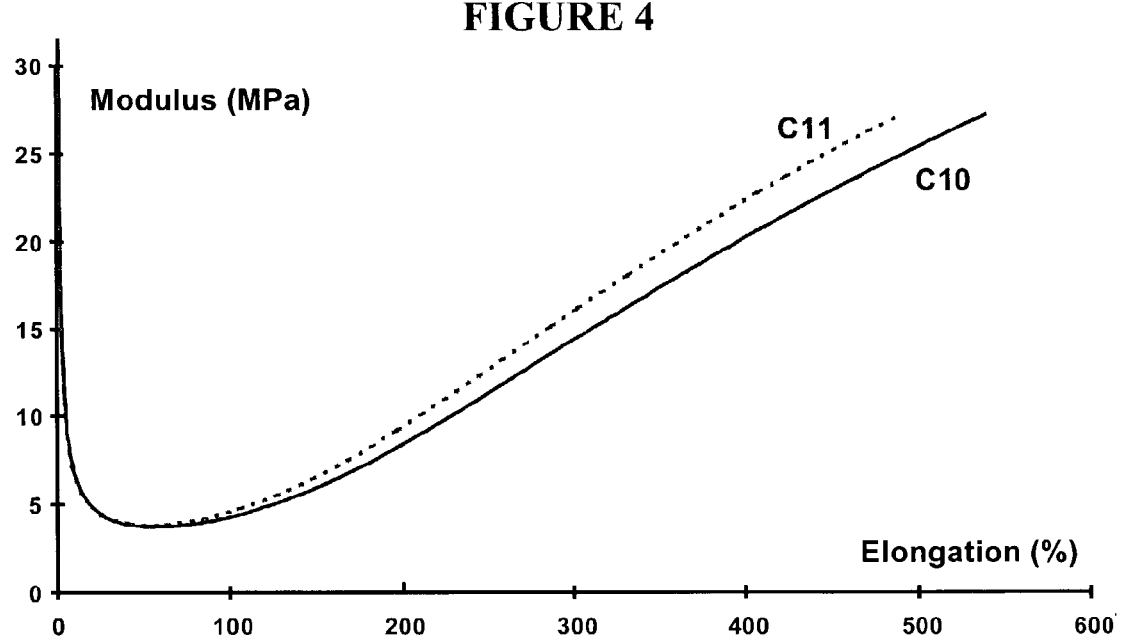
FIG. 4 shows curves of the variation of modulus (in MPa) as a function of elongation (in %) for rubber compositions C10 and C11.

FIG. 4 shows the curves of modulus (in MPa) as a function of the elongation (in %), where these curves are marked C10 to C11 and correspond to Compositions Nos. 10 and 11, respectively.

Examining the results of Table 8 shows that the composition according to the invention (No. 11), compared with the control Composition No. 10, has in the uncured state a Mooney viscosity which is little different (hence equivalent processing properties), a scorching time which is shorter but satisfactory, and substantially improved properties in the cured state. These substantially improved properties include: (1) higher moduli at the high deformations (M100 and M300) and a ratio of M300/M100 that is also higher (which are indicators of greater reinforcement); (2) lower hysteresis losses (HL); and (3) an equivalent breaking stress.

FIG. 4 confirms the above results. For elongations of 100% and more, all the values of modulus are greater in the case of the composition according to the invention (compare curves C11 and C10). For such a range of elongations, such behavior clearly illustrates a better interaction between the reinforcing inorganic filler and the elastomer, due to the coupling system according to the invention.

Test 5: Three rubber compositions are prepared which comprise as reinforcing inorganic filler a (50/50) mixture of silica and alumina. The alumina is a reinforcing alumina such as described in the aforementioned patent application EP 0 810 258.

These compositions are identical except for the following differences:

Composition No. 12 comprises TESPT with DPG but without 1,2-DHP;
Composition No. 13 comprises TESPT activated by 1,2-DHP and DPG; and
Composition No. 14 comprises TESPT activated by 1,2-DHP and DPG.

Composition No. 12 is the control for this test and contains an amount of PSAS of less than 8% (precisely, 6.6%) relative to the weight of inorganic filler (6.5 phr of TESPT relative to 99 phr of filler). Compositions No. 13 and No. 14, according to the invention, comprise the coupling system according to the invention (PSAS+1,2-DHP+DPG)

in an amount which is also, advantageously, less than 8% (precisely, 7.9%) relative to the weight of total reinforcing inorganic filler.

Tables 9 and 10 below show the formulation of the different compositions, and their properties before and after curing (40 minutes at 150° C.).

TABLE 9

| Composition No: | 12 | 13 | 14 |
|---|---|---|---|
| SBR (1) | 88.5 | 88.5 | 88.5 |
| BR (2) | 25 | 25 | 25 |
| silica (3) | 49.5 | 49.5 | 49.5 |
| alumina (3a) | 49.5 | 49.5 | 49.5 |
| aromatic oil | 21.5 | 21.5 | 21.5 |
| TESPT (Si69) | 6.5 | 6.5 | 6.5 |
| 1,2-DHP (4) | — | 0.5 | — |
| 1,2-DHP (9) | — | — | 0.5 |
| ZnO | 2.5 | 2.5 | 2.5 |
| stearic acid | 2 | 2 | 2 |
| antioxidant (5) | 1.9 | 1.9 | 1.9 |
| DPG (6) | 0.9 | 0.9 | 0.9 |
| sulfur | 1.1 | 1.1 | 1.1 |
| CBS (7) | 2 | 2 | 2 |

(1) to (7) See Table 1 above;
(3a) Alumina "CR125" from Baïkowski; (in the form of powder - BET: approximately 105 m²/g).
(9) 1,2-DHP of formula II-2 (Vulkacit 576 from Bayer).

TABLE 10

| Composition No.: | 12 | 13 | 14 |
|---|---|---|---|
| Properties before curing: | | | |
| Mooney (MU) | 86 | 109 | 104 |
| T5 (min) | 14 | 10 | 10 |
| Properties after curing: | 80 | | |
| M10 (MPa) | 5.06 | 5.28 | 5.38 |
| M100 (MPa) | 1.65 | 1.86 | 1.84 |
| M300 (MPa) | 1.87 | 2.33 | 2.18 |
| M300/M100 | 1.13 | 1.25 | 1.18 |
| HL (%) | 32.7 | 30.4 | 32.2 |
| Breaking stress (MPa) | 22.0 | 22.3 | 22.3 |
| Elongation at break (%) | 613 | 531 | 559 |

Figure 5:
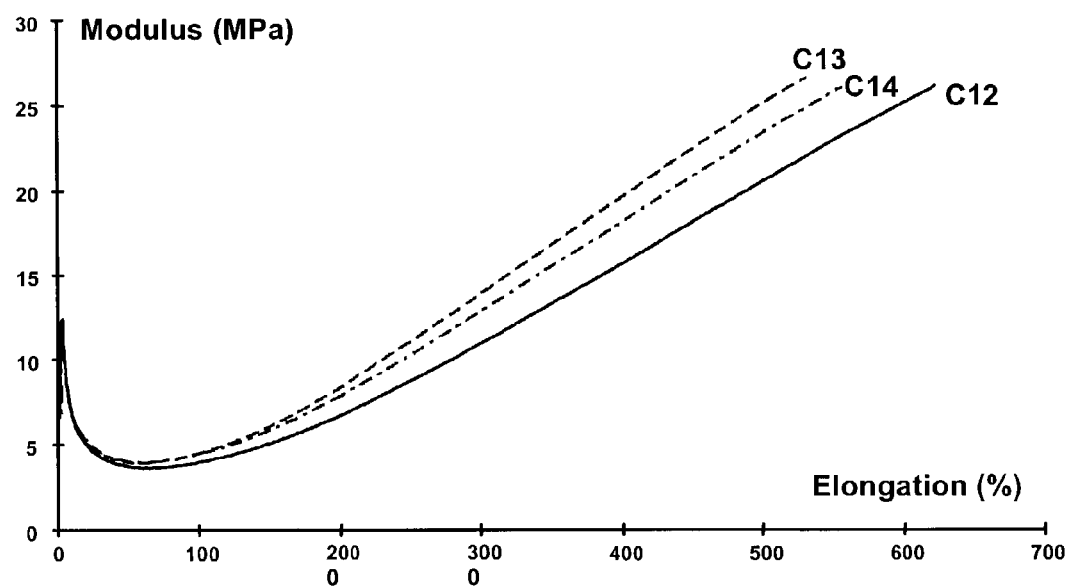
FIG. 5 shows curves of the variation of modulus (in MPa) as a function of elongation (in %) for rubber compositions C12, C13, and C14.

FIG. 5 shows the curves of modulus as a function of the elongation, where the curves are marked C12 to C14 and correspond to Compositions No. 12 to No. 14, respectively).

Examination of the results shows for the compositions of the invention, higher Mooney viscosities (which can be reduced by the addition of a covering agent), but improved properties in the cured state, including: higher moduli M100 and M300, and ratio of M300/M100; and lower HL losses. FIG. 5 confirms these results, where for elongations of 100% and more, higher moduli for the compositions of the invention are shown (curves C13 and C14 above curve C12).

It will furthermore be noted that the best results (M100, M300, ratio of M300/M100, and HL) are obtained with the butyraldehyde-aniline condensate having the highest content of 1,2-DHP (Vanax 808 HP), as confirmed by the curves of FIG. 5 (curve C13 above curve C14).

Test 6: In this test, the results of the preceding test are confirmed in the presence of another reinforcing alumina (in accordance with the aforementioned patent application EP 0 810 258), of different BET surface area (amount of PSAS: 6% by weight relative to the quantity of reinforcing inorganic filler).

The two compositions tested are identical except for the following differences:

Composition No. 15 comprises TESPT with DPG but without 1,2-DHP; and
Composition No. 16 comprises TESPT activated by 1,2-DHP and DPG.

Composition No. 15 is the control for this test. In composition No. 16 according to the present invention, the total quantity of the coupling system (TESPT+1,2-DHP+DPG) is advantageously less than 8% (precisely, 7.5%) by weight relative to the quantity of inorganic filler.

Tables 11 and 12 below show the formulation of the compositions and their properties before and after curing (40 minutes at 150° C.).

TABLE 11

| Composition No.: | 15 | 16 |
|---|---|---|
| SBR (1) | 88.5 | 88.5 |
| BR (2) | 25 | 25 |
| silica (3) | 47.5 | 47.5 |
| alumina (3a) | 47.5 | 47.5 |
| aromatic oil | 21.5 | 21.5 |
| TESPT (Si69) | 5.7 | 5.7 |
| 1,2-DHP (4) | — | 0.5 |
| ZnO | 2.5 | 2.5 |
| stearic acid | 2 | 2 |
| antioxidant (5) | 1.9 | 1.9 |
| DPG (6) | 0.9 | 0.9 |
| sulfur | 1.1 | 1.1 |
| CBS (7) | 2 | 2 |

(1) to (7) See Table 1 above;
(3a) Alumina "APA-100RDX" from Condéa (in the form of powder - BET: approximately 85 m²/g).

TABLE 12

| Composition No.: | 15 | 16 |
|---|---|---|
| Properties before curing: | | |
| Mooney (MU) | 71 | 75 |
| T5 (min) | 18 | 12 |
| Properties after curing: | | |
| M10 (MPa) | 4.11 | 3.89 |
| M100 (MPa) | 1.45 | 1.59 |
| M300 (MPa) | 1.65 | 2.07 |
| M300/M100 | 1.14 | 1.30 |
| HL (%) | 30.9 | 24.9 |
| Breaking stress (MPa) | 19.6 | 20.1 |
| Elongation at break (%) | 600 | 536 |

Figure 6:
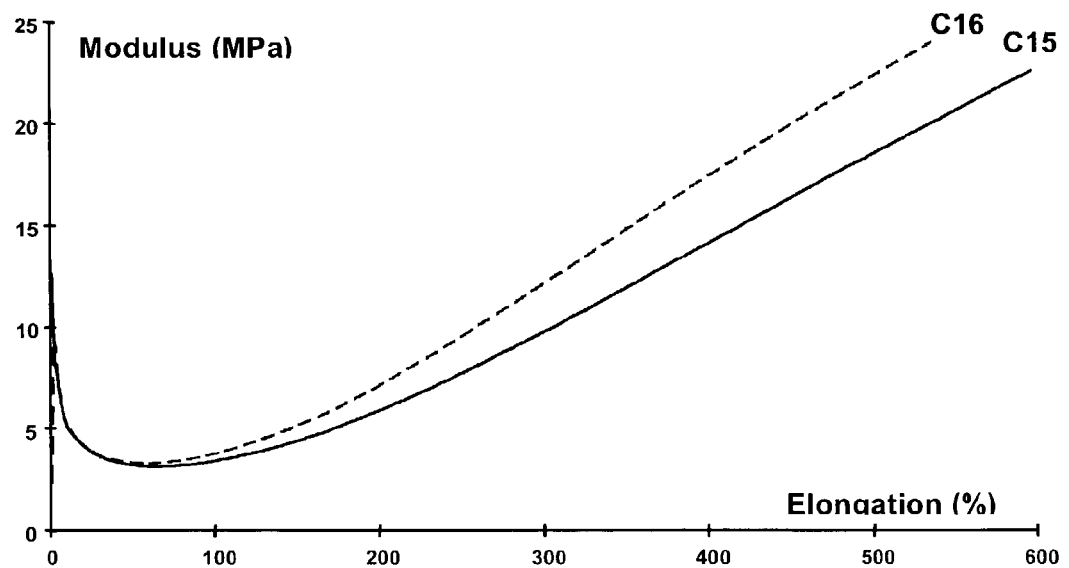
FIG. 6 shows curves of the variation of modulus (in MPa) as a function of elongation (in %) for rubber compositions C15 and C16.

FIG. 6 shows the curves of modulus as a function of the elongation (marked C15 and C16).

The results show that the composition of the present invention, compared with the control, has in the uncured state a virtually identical viscosity and a reduced but satisfactory scorching time, and in the cured state properties indicative of better coupling including: higher moduli M100 and M300 and ratio of M300/M100, and losses HL that are significantly reduced. FIG. 6 confirms these results, where curve C16 is located clearly above the control curve C15.

Test 7: This test shows that the presence of a guanidine derivative (DPG or DOTG) is an essential characteristic in the coupling system according to the invention.

The four compositions tested are identical except for the following differences:

Composition No. 17 comprises TESPT with DPG but without 1,2-DHP;
Composition No. 18 comprises TESPT with 1,2-DHP but without guanidine derivative;

Composition No. 19 comprises TESPT with DPG and 1,2-DHP; and

Composition No. 20 comprises TESPT with DOTG and 1,2-DHP.

Only Compositions No. 19 and No. 20 are therefore in accordance with the present invention; Composition No. 17 is the control according to the prior art. Tables 13 and 14 below show the formulation and the properties of these compositions before and after curing (40 minutes at 150° C.).

TABLE 13

| Composition No: | 17 | 18 | 19 | 20 |
|---|---|---|---|---|
| SBR (1) | 88.5 | 88.5 | 88.5 | 88.5 |
| BR (2) | 25 | 25 | 25 | 25 |
| silica (3) | 80 | 80 | 80 | 80 |
| aromatic oil | 21.5 | 21.5 | 21.5 | 21.5 |
| TESPT (Si69) | 6.4 | 6.4 | 6.4 | 6.4 |
| 1,2-DHP (4) | — | 0.5 | 0.5 | 0.5 |
| ZnO | 2.5 | 2.5 | 2.5 | 2.5 |
| stearic acid | 2 | 2 | 2 | 2 |
| antioxidant (5) | 1.9 | 1.9 | 1.9 | 1.9 |
| DPG (6) | 1.5 | — | 1.5 | — |
| DOTG (10) | — | — | — | 1.5 |
| sulfur | 1.1 | 1.1 | 1.1 | 1.1 |
| CBS (7) | 2 | 2 | 2 | 2 |

(1) to (7) See Table 1 above;
(10) DOTG from Vanderbilt, formula (III-2).

TABLE 14

| Composition No.: | 17 | 18 | 19 | 20 |
|---|---|---|---|---|
| Properties before curing: | | | | |
| Mooney (MU) | 80 | 123 | 95 | 90 |
| T5 (min) | 20 | 22 | 12 | 17 |
| Properties after curing: | | | | |
| M10 (MPa) | 5.07 | 4.78 | 5.30 | 5.37 |
| M100 (MPa) | 1.55 | 1.60 | 1.98 | 1.83 |
| M300 (MPa) | 1.85 | 1.84 | 2.77 | 2.41 |
| M300/M100 | 1.19 | 1.15 | 1.40 | 1.32 |
| HL (%) | 31 | 33 | 25 | 27 |
| Breaking stress (MPa) | 22.0 | 21.2 | 21.7 | 20.5 |
| Elongation at break (%) | 585 | 585 | 442 | 465 |

Figure 7:
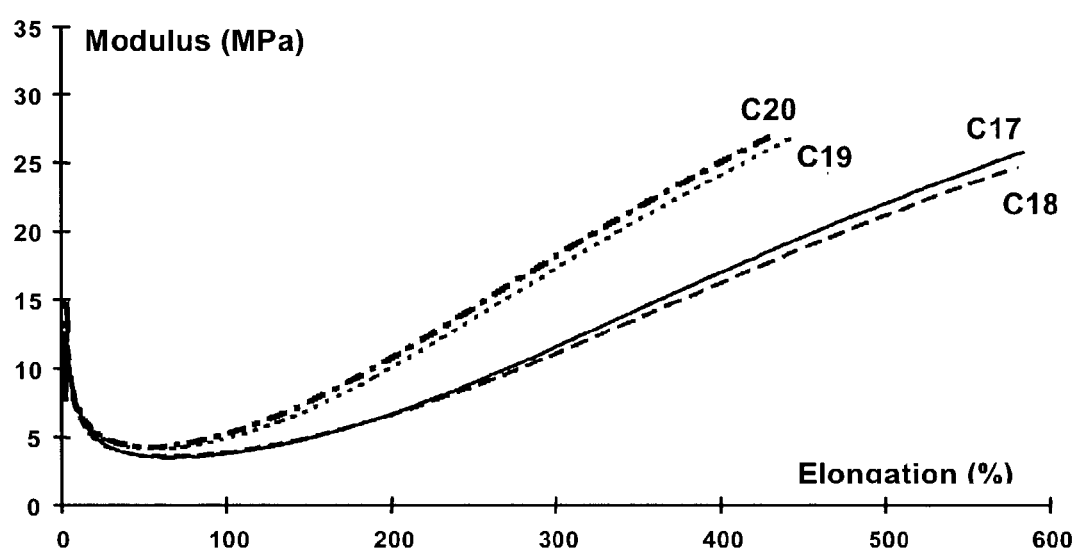
FIG. 7 shows curves of the variation of modulus (in MPa) as a function of elongation (in %) for rubber compositions C17, C18, C19, and C20.

FIG. 7 shows the curves of modulus as a function of the elongation, where the curves are marked C17 to C20 and correspond to Compositions No. 17 to No. 20, respectively.

A study of the different results shows that the compositions of the present invention, compared with the control Composition No. 17, have significantly improved properties in the cured state including: moduli M100 and M300 and ratio of M300/M100 clearly higher, values HL very substantially reduced, which are both clear indicators of improved coupling. This is confirmed by FIG. 7, where curves C19 and C20 are located clearly above the control curve C17.

As for Composition No. 18, which is devoid of guanidine derivative, these properties appear to be overall degraded compared with those of the composition of the present invention, both in the uncured state and after curing (distinctly higher viscosity; greater losses HL; lower ratio of M300/M100; curve C18 slightly below the curve C17).

These results therefore show clearly that in the absence of guanidine derivative, the 1,2-DHP has no effect on the coupling agent.

Test 8: This test shows that it is possible, because of the strong activation provided by the 1,2-DHP and the guanidine derivative in combination, to reduce very substantially the quantity of PSAS (here, disulfurized alkoxysilane TESPD), while keeping the reinforcement properties at a substantially identical level.

The three compositions tested are identical except for the following differences:

Composition No. 21 comprises TESPD (5.6 phr) with DPG but without 1,2-DHP;

Composition No. 22 comprises TESPD (3.5 phr) with DPG but without 1,2-DHP; and

Composition No. 23 comprises TESPD (3.5 phr) with DPG (1.5 phr) and 1,2-DHP (0.5 phr, or 14.3% by weight relative to the quantity of TESPD).

Composition No. 21 is the reference of the prior art. It will be noted that the amount of PSAS thereof is very significantly (60%) greater than the amount of PSAS of the composition according to the present invention, Composition No. 23. In the composition of the present invention (No. 23), the total quantity (TESPD+1,2-DHP) represents less than 6% (precisely, 5%) by weight relative to the quantity of silica. As for the coupling system itself (PSAS+1,2-DHP+DPG), it is advantageously present in an amount of less than 8% (precisely, 6.9%) by weight relative to this same quantity.

Tables 15 and 16 below show the formulation of the different compositions and their properties before and after curing (150° C., 40 minutes).

TABLE 15

| Composition No: | 21 | 22 | 23 |
|---|---|---|---|
| SBR (1) | 88.5 | 88.5 | 88.5 |
| BR (2) | 25 | 25 | 25 |
| silica (3) | 80 | 80 | 80 |
| aromatic oil | 21.5 | 21.5 | 21.5 |
| TESPD (Si266) | 5.6 | 3.5 | 3.5 |
| 1,2-DHP (4) | — | — | 0.5 |
| ZnO | 2.5 | 2.5 | 2.5 |
| stearic acid | 2 | 2 | 2 |
| antioxidant (5) | 1.9 | 1.9 | 1.9 |
| DPG (6) | 1.5 | 1.5 | 1.5 |
| sulfur | 1.1 | 1.1 | 1.1 |
| CBS (7) | 2 | 2 | 2 |

(1) to (7) See Table 1 above.

TABLE 16

| Composition No.: | 21 | 22 | 23 |
|---|---|---|---|
| Properties before curing: | | | |
| Mooney (MU) | 81 | 110 | 108 |
| T5 (min) | 28 | 23 | 18 |
| Properties after curing: | | | |
| M10 (MPa) | 4.95 | 5.66 | 5.69 |
| M100 (MPa) | 1.32 | 1.27 | 1.40 |
| M300 (MPa) | 1.40 | 1.14 | 1.42 |
| M300/M100 | 1.06 | 0.90 | 1.01 |
| HL (%) | 35 | 40 | 35 |
| Breaking stress (MPa) | 20.4 | 18.9 | 21.2 |
| Elongation at break (%) | 737 | 819 | 747 |

Figure 8:
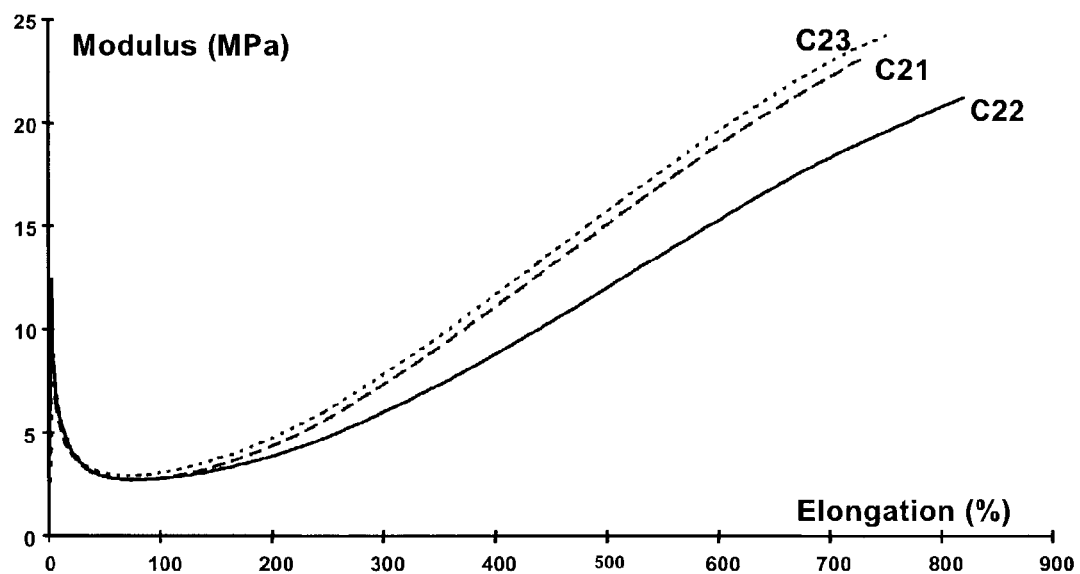
FIG. 8 shows curves of the variation of modulus (in MPa) as a function of elongation (in %) for rubber compositions C21, C22, and C23.

FIG. 8 shows the curves of modulus and the elongation, where the curves are marked C21 to C23 and correspond to Compositions No. 21 to No. 23, respectively.

The results show that Composition No. 23 according to the present invention, compared with the reference Composition No. 21, has equivalent performance after curing despite a significantly lower amount of TESPD: moduli M100 and M300, ratio of M300/M100, properties at break, and losses HL are substantially identical. As for the control Composition No. 22 containing the same amount of TESPD as the composition of the present invention, it shows performances which are significantly degraded in the absence of 1,2-DHP.

FIG. 8 confirms these results, where the composition of the present invention (curve C23) has values of modulus slightly better than those of the reference Composition No. 21 (curve C21) and very much beyond those of the control Composition No. 22, which is devoid of 1,2-DHP.

Test 9: In this test, the invention is implemented with a PSAS other than the symmetrical PSAS used in the preceding tests, in the case in point, a PSAS of the polymeric type.

For this test, two compositions are prepared, which are identical apart from the following differences:
Composition No. 24 comprises PSAS with DPG but without 1,2-DHP; and
Composition No. 25 comprises PSAS activated by 1,2-DHP and DPG.

Composition No. 24 is the control for this test; Composition No. 25, which is in accordance with the present invention, comprises the coupling system according to the invention (PSAS+1,2-DHP+guanidine derivative) in a preferred amount less than 12% (precisely, 10.5%) relative to the weight of inorganic filler.

The PSAS tested corresponds to the known formula shown below (according to WO 96/10604):

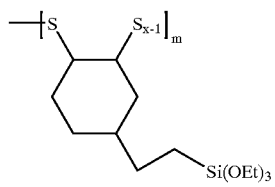

Tables 17 and 18 below show the formulation of the two compositions and their properties before and after curing (40 minutes at 150° C.).

TABLE 17

| Composition No.: | 24 | 25 |
|---|---|---|
| SBR (1) | 88.5 | 88.5 |
| BR (2) | 25 | 25 |
| silica (3) | 80 | 80 |
| aromatic oil | 21.5 | 21.5 |
| PSAS (11) | 6.4 | 6.4 |
| 1,2-DHP (4) | — | 0.5 |
| ZnO | 2.5 | 2.5 |
| stearic acid | 2 | 2 |
| antioxidant (5) | 1.9 | 1.9 |
| DPG (6) | 1.5 | 1.5 |
| sulfur | 1.1 | 1.1 |
| CBS (7) | 2 | 2 |

(1) to (7) See Table 1 above;
(11) PSAS polymeric type (WO 96/10604).

TABLE 18

| Composition No.: | 24 | 25 |
|---|---|---|
| Properties before curing: | | |
| Mooney (MU) | 86 | 86 |
| T5 (min) | 20 | 15 |

TABLE 18-continued

| Composition No.: | 24 | 25 |
|---|---|---|
| Properties after curing.: | | |
| M10 (MPa) | 5.39 | 5.74 |
| M100 (MPa) | 1.69 | 1.93 |
| M300 (MPa) | 2.09 | 2.50 |
| M300/M100 | 1.24 | 1.30 |
| HL (%) | 31 | 28 |
| Breaking stress (MPa) | 20.5 | 22.2 |
| Elongation at break (%) | 582 | 552 |

Figure 9:
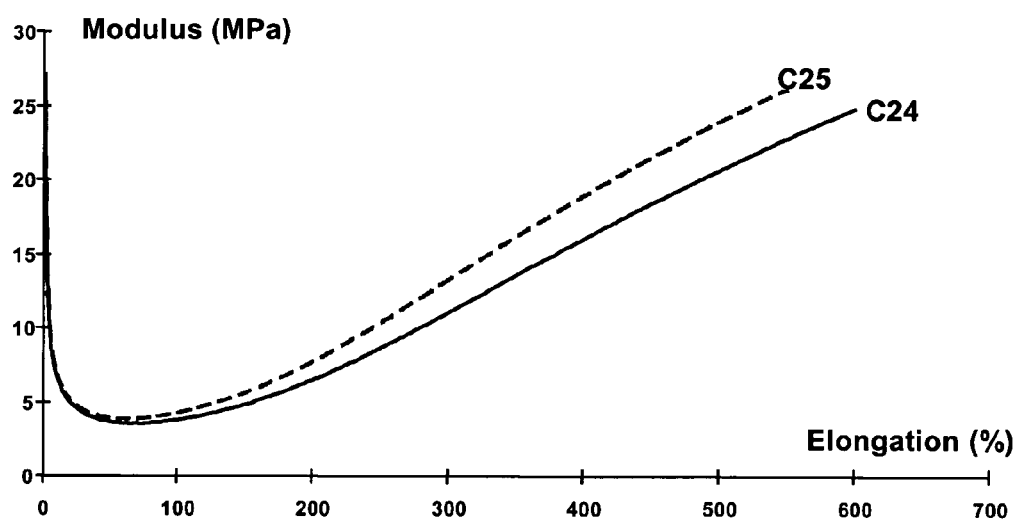
FIG. 9 shows curves of the variation of modulus (in MPa) as a function of elongation (in %) for rubber compositions C24 and C25.

FIG. 9 shows the curves of modulus and the elongation, where the curves are marked C24 and C25.

The results show that the composition of the present invention, compared with the control composition, has properties before curing which are substantially identical and improved properties after curing: higher moduli at the high deformations M100 and M300, and ratio of M300/M100 (which are indicators of better reinforcement), lower (hence better) losses HL. FIG. 9 confirms these results, where, for elongations of 100% and more, significantly higher modulus values for the composition of the present invention (curve C24) are shown. All of this clearly illustrates better interaction between the inorganic filler and the elastomer.

Test 10: It is known that a substantial reduction in the amount of PSAS risks involving an increase in the viscosity in the uncured state of the rubber compositions, which increase may adversely affect the industrial processing thereof. This test shows that it is possible to overcome such a disadvantage by the addition to the compositions of the invention of a covering agent for the inorganic filler.

In such a case, according to a particularly preferred embodiment of the invention, there is then associated with the PSAS, as covering agent, a hydroxylated polyorganosiloxane, in particular an α,ω-dihydroxy-polyorganosiloxane, in accordance with the teaching of patent application EP 0 784 072.

Six compositions are prepared for this test, where the compositions are identical, apart from the following differences:
Composition No. 26 comprises TESPT (6.4 phr) with DPG but without 1,2-DHP;
Composition No. 27 comprises TESPT (4 phr), with DPG but without 1,2-DHP;
Composition No. 28 comprises TESPT (4 phr) activated by DPG and 1,2-DHP; and
Compositions No. 29 to No. 31 are identical to Composition No. 28 but also comprise variable amounts (0.5 to 2.4 phr) of different covering agents (alkyltrialkoxysilanes or α,ω-dihydroxy-polyorganosiloxane).

Composition No. 26 is the reference of the prior art, and Composition No. 27 represents a control with an identical amount of TESPT compared with the compositions according to the present invention, Composition No. 28 to No. 31.

Tables 19 and 20 below show the formulation of the different compositions and their properties before and after curing (150° C., 40 minutes).

TABLE 19

| Composition No.: | 26 | 27 | 28 | 29 | 30 | 31 |
|---|---|---|---|---|---|---|
| SBR (1) | 88.5 | 88.5 | 88.5 | 88.5 | 88.5 | 88.5 |
| BR (2) | 25 | 25 | 25 | 25 | 25 | 25 |
| silica (3) | 80 | 80 | 80 | 80 | 80 | 80 |

TABLE 19-continued

| Composition No.: | 26 | 27 | 28 | 29 | 30 | 31 |
|---|---|---|---|---|---|---|
| aromatic oil | 21.5 | 21.5 | 21.5 | 21.5 | 21.5 | 21.5 |
| TESPT (Si69) | 6.4 | 4 | 4 | 4 | 4 | 4 |
| 1,2-DHP (4) | — | — | 0.5 | 0.5 | 0.5 | 0.5 |
| ZnO | 2.5 | 2.5 | 2.5 | 2.5 | 2.5 | 2.5 |
| anti-ozone wax | 1.5 | 1.5 | 1.5 | 1.5 | 1.5 | 1.5 |
| stearic acid | 2 | 2 | 2 | 2 | 2 | 2 |
| antioxidant (5) | 1.9 | 1.9 | 1.9 | 1.9 | 1.9 | 1.9 |
| DPG (6) | 1.5 | 1.5 | 1.5 | 1.5 | 1.5 | 1.5 |
| covering agent (12) | — | — | — | 2.4 | — | — |
| covering agent (13) | — | — | — | — | 1.6 | — |
| covering agent (14) | — | — | — | — | — | 0.5 |
| sulfur | 1.1 | 1.1 | 1.1 | 1.1 | 1.1 | 1.1 |
| CBS (7) | 2 | 2 | 2 | 2 | 2 | 2 |

(1) to (7) See Table 1 above;
(12) Octyltriethoxysilane ("Dynasylan Octeo" from Hüls);
(13) Hexadecyltrimethoxysilane ("Si116" from Degussa);
(14) α,ω-dihydroxy-polydimethylsiloxane (oil "Rhodorsil 48V50" from Rhodia).

TABLE 20

| Composition No.: | 26 | 27 | 28 | 29 | 30 | 31 |
|---|---|---|---|---|---|---|
| Properties before curing: | | | | | | |
| Mooney (MU) | 76 | 96 | 91 | 82 | 71 | 79 |
| T5 (min) | 22 | 20 | 11 | 13 | 16 | 14 |
| Properties after curing: | | | | | | |
| M10 (MPa) | 5.41 | 5.25 | 5.03 | 4.93 | 4.13 | 4.96 |
| M100 (MPa) | 1.71 | 1.37 | 1.62 | 1.63 | 1.52 | 1.60 |
| M300 (MPa) | 2.13 | 1.48 | 2.02 | 2.16 | 2.00 | 2.06 |
| M300/M100 | 1.25 | 1.08 | 1.25 | 1.33 | 1.32 | 1.29 |
| HL (%) | 28 | 35 | 30 | 27 | 26 | 28 |
| Breaking stress (MPa) | 22.8 | 22.7 | 22.9 | 23.8 | 24.2 | 23.7 |
| Elongation at break (%) | 574 | 717 | 565 | 578 | 617 | 577 |

The covering agents were incorporated in the compositions according to the invention at the same time as the PSAS (non-productive stage). In these compositions according to the invention (No. 28 to No. 31), the total quantity of the coupling system (TESPT+1,2-DHP+DPG) advantageously represents less than 8% (precisely, 7.5%) relative to the weight of inorganic filler.

The results of Table 20 show the following observations. It may first be noted that the reduction in the amount of PSAS in the control Composition No. 27, relative to the reference Composition No. 26, involves a general degradation of the properties, both in the uncured state (substantial increase in viscosity, from 76 to 96 MU) and after curing: moduli M100 and M300 greatly reduced, greater losses HL. Also, because of the addition of 1,2-DHP in Composition No. 28 and hence to the combined action of the DPG and the 1,2-DHP, a very clear increase in the properties after curing is noted which covers values (in particular M100, M300, HL) virtually identical to those of the starting reference (Composition No. 26). However, the increase in viscosity in the uncured state (76 to 96 MU) previously observed is compensated for only very slightly (from 96 to 91 MU) by the addition of 1,2-DHP. This increase in viscosity in the uncured state, on the other hand, is completely corrected, while keeping the properties after curing at a level substantially identical to that of the reference composition (No. 26), because of the addition, in the compositions according to the present invention No. 29 to No. 31, of the covering agent (return to values of about 70 to 80 MU).

It may be noted, in particular, that an excellent compromise of properties is obtained with the composition according to the invention (Composition No. 31), despite a very small proportion (less than 1 phr) of α,ω-dihydroxy-polyorganosiloxane oil as covering agent.

Test 11: The invention is illustrated here by running tests on radial-carcass tires of dimension 175/70 R14, which are manufactured in a known manner and which are identical in all points except for the constitution of the rubber composition constituting the tread. The compositions tested are identical to Compositions No. 26, No. 28 and No. 31 of Test 10 above, except that they also contain a small proportion (6 phr) of carbon black (N234), used essentially as a coloring and anti-UV agent, and that they were prepared, for the requirements of these tire tests, in suitable mixers of larger capacity.

The tires thus prepared are subjected to on-road travel on a vehicle of the marque Citroën Xsara, until the wear due to running reaches the wear indicators located in the grooves of the treads. In a manner known to the person skilled in the art, the wear resistance of the rubber composition, during travel of the tire, is directly correlated to the quality of the reinforcement supplied by the reinforcing filler, that is to say to the amount of (filler/elastomer) coupling obtained. In other words, measurement of the wear resistance is an excellent indicator, if not the best, since it is evaluated on the final manufactured product, of the performance of the coupling system used.

It is noted after travel that the tires fitted with treads according to the present invention (corresponding to Compositions No. 28 and No. 31) show a performance virtually identical to that of the control tire (corresponding to Composition No. 26), covering substantially the same mileage, despite a greatly reduced amount of coupling agent (4.0 phr instead of 6.4 phr). This equivalent wear resistance was able to be obtained only because of the strong activation of the coupling provided by the 1,2-DHP and guanidine derivative compounds in combination. Composition No. 31, which incorporates the polyorganosiloxane covering agent, furthermore offered the advantage of facilitated industrial processing (reduced plasticity in the uncured state) compared with Composition No. 28.

The invention thus makes it possible to have treads for tires which have very good wear resistance combined with low rolling resistance, even in the presence of a substantially reduced amount of PSAS (in particular TESPT).

In conclusion, all the above results illustrate improved coupling between the reinforcing inorganic filler and the diene elastomer when both 1,2-DHP and the guanidine derivative are used in association with the PSAS. In other words, these results represent activation, by the 1,2-DHP and the guanidine derivative in combination, of the coupling function fulfilled by the PSAS.

Because of this activation, it is possible to consider reducing the quantity of PSAS, in particular TESPT, while keeping the coupling properties and hence the wear properties at equivalent levels. Thus, the overall cost of the rubber compositions can be reduced, as can that of the tires containing them.

A reduction in the amount of PSAS also has the advantage, from the point of view of the environment (with respect to the release of VOC's or Volatile Organic Compounds), of resulting in a reduction in the amounts of alcohol (ethanol in the presence of TESPT) emitted during the manufacture of the rubber compositions, or during the curing of the rubber articles incorporating these compositions.

The present invention also makes it possible, if a high amount of PSAS is maintained, to obtain a higher level of coupling, and therefore to obtain even better reinforcement of the rubber compositions by the reinforcing inorganic filler.

The novel (inorganic filler/diene elastomer) coupling system according to the present invention thus offers the rubber compositions of the invention a compromise of properties which is advantageous compared with the compositions of the prior art reinforced with an inorganic filler.

What is claimed is:

1. A rubber composition useful for the manufacture of tires, based on a diene elastomer, a reinforcing inorganic filler, and a coupling system, said coupling system comprising a polysulfurized alkoxysilane coupling agent associated with a 1,2-dihydropyridine and a guanidine derivative.

2. The composition of claim 1, wherein the diene elastomer is selected from the group consisting of polybutadienes, polyisoprenes, natural rubber, butadiene copolymers, isoprene copolymers, and mixtures thereof.

3. The composition of claim 1, wherein the reinforcing inorganic filler is a siliceous filler or an aluminous filler.

4. The composition of claim 1, wherein the polysulfurized alkoxysilane is a bis-($C_1$–$C_4$)alkoxysilyl($C_1$–$C_{10}$)alkyl polysulfide.

5. The composition of claim 1, wherein the 1,2-dihydropyridine comprises an aldehyde-primary amine condensate.

6. The composition of claim 1, wherein the 1,2-dihydropyridine is an N-phenyl-1,2-dihydropyridine.

7. The composition of claim 1, in which the quantity of 1,2-dihydropyridine represents between 1% and 20% relative to the weight of polysulfurized alkoxysilane.

8. The composition of claim 1, in which the total amount of the polysulfurized alkoxysilane and the 1,2-dihydropyridine represents less than 10% relative to the weight of the reinforcing inorganic filler.

9. The composition of claim 1, wherein the guanidine derivative is N,N'-diphenylguanidine.

10. The composition of claim 1, in which the quantity of the guanidine derivative represents between 0.5 and 4% relative to the weight of the reinforcing inorganic filler.

11. The composition of claim 1, in which the total quantity of the coupling system comprising the polysulfurized alkoxysilane, the 1,2-dihydropyridine and the guanidine derivative represents between 2% and 20% relative to the weight of the reinforcing inorganic filler.

12. The composition of claim 2, wherein the diene elastomer is a butadiene-styrene copolymer (SBR) having a styrene content of between 20% and 30% by weight, a content of vinyl bonds of the butadiene part of between 15% and 65%, a content of trans-1,4 bonds of between 20% and 75%, and a glass transition temperature of between −20° C. and −55° C.

13. The composition of claim 2, wherein the diene elastomer is a mixture of a butadiene-styrene copolymer (SBR) having a styrene content of between 20% and 30% by weight, a content of vinyl bonds of the butadiene part of between 15% and 65%, a content of trans-1,4 bonds of between 20% and 75%, and a glass transition temperature of between −20° C. and −55° C.; and a polybutadiene having more than 90% cis-1,4 bonds.

14. The composition of claim 1 further comprising carbon black.

15. The composition of claim 4, wherein the polysulfurized alkoxysilane is a bis-($C_1$–$C_4$)alkoxysilylpropyl polysulfide.

16. The composition of claim 15, wherein the polysulfurized alkoxysilane is bis-triethoxysilylpropyl disulfide or bis-triethoxysilylpropyl tetrasulfide.

17. The composition of claim 5, wherein the aldehyde of the aldehyde-primary amine condensate is selected from the group consisting of $C_2$–$C_{12}$ aldehydes.

18. The composition of claim 17, wherein the aldehyde is selected from the group consisting of propionaldehyde, butyraldehyde, valeraldehyde and hexaldehyde.

19. The composition of claim 18, wherein the aldehyde is butyraldehyde.

20. The composition of claim 5, wherein the (aldehyde-primary amine) condensate comprises more than 50% by weight of the 1,2-dihydropyridine.

21. The composition of claim 6, wherein the 1,2-dihydropyridine is 3,5-diethyl-1,2-dihydro-1-phenyl-2-propylpyridine.

22. The composition of claim 1 further comprising a covering agent for the reinforcing inorganic filler.

23. The composition of claim 22, wherein the covering agent is a hydroxylated polyorganosiloxane.

24. The composition of claim 23, wherein the covering agent is an α,ω-dihydroxy-polyorganosiloxane.

25. The composition of claim 1, wherein the composition is in the vulcanized state.

26. A process for preparing a sulfur-vulcanizable rubber composition useful for the manufacture of tires comprising incorporating by kneading into a diene elastomer, a reinforcing inorganic filler, and a coupling system, said coupling system comprising a polysulfurized alkoxysilane coupling agent associated with a 1,2-dihydropyridine, and a guanidine derivative.

27. The process of claim 26, wherein the incorporating is carried out in one or more steps and the entire mixture is thermomechanically kneaded until a maximum temperature of between 120° C. and 190° C. is reached.

28. The process of claim 26, wherein the diene elastomer is selected from the group consisting of polybutadienes, polyisoprenes, natural rubber, butadiene copolymers, isoprene copolymers, and mixtures thereof.

29. The process of claim 26, wherein the reinforcing inorganic filler is a siliceous filler or an aluminous filler.

30. The process of claim 26, wherein the polysulfurized alkoxysilane is a bis-($C_1$–$C_4$)alkoxysilyl($C_1$–$C_{10}$)alkyl polysulfide.

31. The process of claim 26, wherein the 1,2-dihydropyridine comprises an (aldehyde-primary amine) condensate.

32. The process of claim 26, wherein the 1,2-dihydropyridine is an N-phenyl-1,2-dihydropyridine.

33. The process of claim 26, in which the quantity of 1,2-dihydropyridine represents between 1% and 20% relative to the weight of polysulfurized alkoxysilane.

34. The process of claim 26, in which the total amount of the polysulfurized alkoxysilane and the 1,2-dihydropyridine represents less than 10% relative to the weight of the reinforcing inorganic filler.

35. The process of claim 26, wherein the guanidine derivative is N,N'-diphenylguanidine.

36. The process of claim 26, in which the quantity of the guanidine derivative represents between 0.5 and 4% relative to the weight of the reinforcing inorganic filler.

37. The process of claim 26, in which the total quantity of the coupling system comprising the polysulfurized alkoxysilane, the 1,2-dihydropyridine and the guanidine derivative represents between 2% and 20% relative to the weight of the reinforcing inorganic filler.

38. The process of claim 31, wherein the aldehyde of the (aldehyde-primary amine) condensate is selected from the group consisting of $C_2$–$C_{12}$ aldehydes.

39. The process of claim 38, wherein the aldehyde is selected from the group consisting of propionaldehyde, butyraldehyde, valeraldehyde and hexaldehyde.

40. The process of claim 39, wherein the aldehyde is butyraldehyde.

41. The process of claim 31, wherein the aldehyde-primary amine condensate comprises more than 50% by weight of the 1,2-dihydropyridine.

42. The process of claim 32, wherein the 1,2-dihydropyridine is 3,5-diethyl-1,2-dihydro-1-phenyl-2-propylpyridine.

43. The process of claim 26, further comprising incorporating a covering agent for the reinforcing inorganic filler.

44. The process of claim 43, wherein the covering agent is a hydroxylated polyorganosiloxane.

45. The process of claim 44, wherein the covering agent is an α,ω-dihydroxy-polyorganosiloxane.

46. The process of claim 27, wherein the maximum kneading temperature is between 130° C. and 180° C.

47. A tire comprising a rubber composition, wherein the rubber composition is based on a diene elastomer, a reinforcing inorganic filler, and a coupling system, said coupling system comprising a polysulfurized alkoxysilane coupling agent associated with a 1,2-dihydropyridine and a guanidine derivative.

48. The tire of claim 47, wherein the diene elastomer is selected from the group consisting of polybutadienes, polyisoprenes, natural rubber, butadiene copolymers, isoprene copolymers, and mixtures thereof.

49. The tire of claim 47, wherein the reinforcing inorganic filler is a siliceous filler or an aluminous filler.

50. The tire of claim 47, wherein the polysulfurized alkoxysilane is a bis-($C_1$–$C_4$)alkoxysilyl($C_1$–$C_{10}$)alkyl polysulfide.

51. The tire of claim 47, wherein the 1,2-dihydropyridine comprises an aldehyde-primary amine condensate.

52. The tire of claim 47, wherein the 1,2-dihydropyridine is an N-phenyl-1,2-dihydropyridine.

53. The tire of claim 47, in which the quantity of 1,2-dihydropyridine represents between 1% and 20% relative to the weight of polysulfurized alkoxysilane.

54. The tire of claim 47, in which the total amount of the polysulfurized alkoxysilane and the 1,2-dihydropyridine represents less than 10% relative to the weight of the reinforcing inorganic filler.

55. The tire of claim 47, wherein the guanidine derivative is N,N'-diphenylguanidine.

56. The tire of claim 47, in which the quantity of the guanidine derivative represents between 0.5 and 4% relative to the weight of the reinforcing inorganic filler.

57. The tire of claim 47, in which the total quantity of the coupling system comprising the polysulfurized alkoxysilane, the 1,2-dihydropyridine and the guanidine derivative represents between 2% and 20% relative to the weight of the reinforcing inorganic filler.

58. The tire of claim 48, wherein the diene elastomer is a butadiene-styrene copolymer (SBR) having a styrene content of between 20% and 30% by weight, a content of vinyl bonds of the butadiene part of between 15% and 65%, a content of trans-1,4 bonds of between 20% and 75%, and a glass transition temperature of between –20° C. and –55° C.

59. The tire of claim 48, wherein the diene elastomer is a mixture of a butadiene-styrene copolymer (SBR) having a styrene content of between 20% and 30% by weight, a content of vinyl bonds of the butadiene part of between 15% and 65%, a content of trans-1,4 bonds of between 20% and 75%, and a glass transition temperature of between –20° C. and –55° C.; and a polybutadiene having more than 90% cis-1,4 bonds.

60. The tire of claim 47, wherein the rubber composition further comprises carbon black.

61. The tire of claim 50, wherein the polysulfurized alkoxysilane is a bis-($C_1$–$C_4$)alkoxysilylpropyl polysulfide.

62. The tire of claim 61, wherein the polysulfurized alkoxysilane is bis-triethoxysilylpropyl disulfide or bis-triethoxysilylpropyl tetrasulfide.

63. The tire of claim 51, wherein the aldehyde of the aldehyde-primary amine condensate is selected from the group consisting of $C_2$–$C_{12}$ aldehydes.

64. The tire of claim 63, wherein the aldehyde is selected from the group consisting of propionaldehyde, butyraldehyde, valeraldehyde, and hexaldehyde.

65. The tire of claim 64, wherein the aldehyde is butyraldehyde.

66. The tire of claim 51, wherein the aldehyde-primary amine condensate comprises more than 50% by weight of the 1,2-dihydropyridine.

67. The tire of claim 52, wherein the 1,2-dihydropyridine is 3,5-diethyl-1,2-dihydro-1-phenyl-2-propylpyridine.

68. The tire of claim 47, wherein the rubber composition further comprises a covering agent for the reinforcing inorganic filler.

69. The tire of claim 68, wherein the covering agent is a hydroxylated polyorganosiloxane.

70. The tire of claim 69, wherein the covering agent is an α,ω-dihydroxy-polyorganosiloxane.

71. A tire tread comprising a rubber composition, wherein the rubber composition is based on a diene elastomer, a reinforcing inorganic filler, and a coupling system, said coupling system comprising a polysulfurized alkoxysilane coupling agent associated with a 1,2-dihydropyridine and a guanidine derivative.

72. The tread of claim 71, wherein the diene elastomer is selected from the group consisting of polybutadienes, polyisoprenes, natural rubber, butadiene copolymers, isoprene copolymers, and mixtures thereof.

73. The tread of claim 71, wherein the reinforcing inorganic filler is a siliceous filler or an aluminous filler.

74. The tread of claim 71, wherein the polysulfurized alkoxysilane is a bis-($C_1$–$C_4$)alkoxysilyl($C_1$–$C_{10}$)alkyl polysulfide.

75. The tread of claim 71, wherein the 1,2-dihydropyridine comprises an aldehyde-primary amine condensate.

76. The tread of claim 71, wherein the 1,2-dihydropyridine is an N-phenyl-1,2-dihydropyridine.

77. The tread of claim 71, in which the quantity of 1,2-dihydropyridine represents between 1% and 20% relative to the weight of polysulfurized alkoxysilane.

78. The tread of claim 71, in which the total amount of the polysulfurized alkoxysilane and the 1,2-dihydropyridine represents less than 10% relative to the weight of the reinforcing inorganic filler.

79. The tread of claim 71, wherein the guanidine derivative is N,N'-diphenylguanidine.

80. The tread of claim 71, in which the quantity of the guanidine derivative represents between 0.5 and 4% relative to the weight of the reinforcing inorganic filler.

81. The tread of claim 71, in which the total quantity of the coupling system comprising the polysulfurized alkoxysilane, the 1,2-dihydropyridine and the guanidine derivative represents between 2% and 20% relative to the weight of the reinforcing inorganic filler.

82. The tread of claim 72, wherein the diene elastomer is a butadiene-styrene copolymer (SBR) having a styrene content of between 20% and 30% by weight, a content of vinyl bonds of the butadiene part of between 15% and 65%, a content of trans-1,4 bonds of between 20% and 75%, and a glass transition temperature of between −20° C. and −55° C.

83. The tread of claim 72, wherein the diene elastomer is a mixture of a butadiene-styrene copolymer (SBR) having a styrene content of between 20% and 30% by weight, a content of vinyl bonds of the butadiene part of between 15% and 65%, a content of trans-1,4 bonds of between 20% and 75%, and a glass transition temperature of between −20° C. and −55° C.; and a polybutadiene having more than 90% cis-1,4 bonds.

84. The tread of claim 71, wherein the rubber composition further comprises carbon black.

85. The tread of claim 74, wherein the polysulfurized alkoxysilane is a bis-($C_1$–$C_4$)alkoxysilylpropyl polysulfide.

86. The tread of claim 85, wherein the polysulfurized alkoxysilane is bis-triethoxysilylpropyl disulfide or bis-triethoxysilylpropyl tetrasulfide.

87. The tread of claim 75, wherein the aldehyde of the aldehyde-primary amine condensate is selected from the group consisting of $C_2$–$C_{12}$ aldehydes.

88. The tread of claim 87, wherein the aldehyde is selected from the group consisting of propionaldehyde, butyraldehyde, valeraldehyde and hexaldehyde.

89. The tread of claim 88, wherein the aldehyde is butyraldehyde.

90. The tread of claim 75, wherein the aldehyde-primary amine condensate comprises more than 50% by weight of the 1,2-dihydropyridine.

91. The tread of claim 76, wherein the 1,2-dihydropyridine is 3,5-diethyl-1,2-dihydro-1-phenyl-2-propylpyridine.

92. The tread of claim 71, wherein the rubber composition further comprises a covering agent for the reinforcing inorganic filler.

93. The tread of claim 92, wherein the covering agent is a hydroxylated polyorganosiloxane.

94. The tread of claim 93, wherein the covering agent is an α,ω-dihydroxy-polyorganosiloxane.

95. A coupling system for a rubber composition based on a diene elastomer reinforced by an inorganic filler, useful for the manufacture of tires, the coupling system comprising a polysulfurized alkoxysilane coupling agent in association with a 1,2ndihydropyridine and a guanidine derivative.

96. The coupling system of claim 95, wherein the polysulfurized alkoxysilane is a bis-($C_1$–$C_4$)alkoxysilyl($C_1$–$C_{10}$) alkyl polysulfide.

97. The coupling system of claim 95, wherein the 1,2-dihydropyridine comprises an aldehyde-primary amine condensate.

98. The coupling system of claim 95, wherein the 1,2-dihydropyridine is an N-phenyl-1,2-dihydropyridine.

99. The coupling system of claim 95, in which the quantity of 1,2-dihydropyridine represents between 1% and 20% relative to the weight of polysulfurized alkoxysilane.

100. The coupling system of claim 95, wherein the guanidine derivative is N,N'-diphenylguanidine.

101. The coupling system of claim 96, wherein the polysulfurized alkoxysilane is a bis-($C_1$–$C_4$)alkoxysilylpropyl polysulfide.

102. The coupling system of claim 97, wherein the aldehyde of the aldehyde-primary amine condensate is selected from the group consisting of propionaldehyde, butyraldehyde, valeraldehyde, and hexaldehyde.

103. The coupling system of claim 102, wherein the aldehyde is butyraldehyde.

104. The coupling system of claim 97, wherein the aldehyde-primary amine condensate comprises more than 50% by weight of the 1,2-dihydropyridine.

105. The coupling system of claim 98, wherein the 1,2-dihydropyridine is 3,5-diethyl-1,2-dihydro-1-phenyl-2-propylpyridine.

106. A semi-finished product for a tire comprising a rubber composition, wherein said rubber composition is based on a diene elastomer, a reinforcing inorganic filler, and a coupling system, said coupling system comprising a polysulfurized alkoxysilane coupling agent associated with a 1,2-dihydropyridine and a guanidine derivative.

* * * * *